US012314000B1

(12) United States Patent
Gong et al.

(10) Patent No.: US 12,314,000 B1
(45) Date of Patent: May 27, 2025

(54) PROCESS CARTRIDGE

(71) Applicant: JIANGXI YIBO E-TECH CO. LTD., Xinyu (CN)

(72) Inventors: Xiaomin Gong, Xinyu (CN); Shiping Ao, Xinyu (CN); Rongli Xu, Xinyu (CN); Jun Li, Xinyu (CN)

(73) Assignee: JIANGXI YIBO E-TECH CO. LTD., Xinyu (CN)

( * ) Notice: Subject to any disclaimer, the term of this patent is extended or adjusted under 35 U.S.C. 154(b) by 0 days.

(21) Appl. No.: 19/038,663

(22) Filed: Jan. 27, 2025

Related U.S. Application Data

(63) Continuation of application No. PCT/CN2024/075838, filed on Feb. 4, 2024.

(30) Foreign Application Priority Data

| | | |
|---|---|---|
| Feb. 4, 2023 | (CN) | 202320109485.2 |
| Feb. 24, 2023 | (CN) | 202320311882.8 |
| Mar. 25, 2023 | (CN) | 202320609499.0 |
| Apr. 4, 2023 | (CN) | 202320722901.6 |
| Sep. 13, 2023 | (CN) | 202322490238.4 |

(51) Int. Cl.
*G03G 21/18* (2006.01)
*G03G 21/16* (2006.01)

(52) U.S. Cl.
CPC ..... *G03G 21/1821* (2013.01); *G03G 21/1647* (2013.01); *G03G 21/1652* (2013.01); *G03G 21/1814* (2013.01); *G03G 21/1842* (2013.01); *G03G 21/186* (2013.01); *G03G 21/1867* (2013.01); *G03G 2221/1869* (2013.01)

(58) Field of Classification Search
CPC ........... G03G 21/1647; G03G 21/1652; G03G 21/1814; G03G 21/1821; G03G 21/1842; G03G 21/186; G03G 21/1867; G03G 2221/1869
See application file for complete search history.

(56) References Cited

U.S. PATENT DOCUMENTS

| | | | |
|---|---|---|---|
| 7,899,364 | B2 | 3/2011 | Chadani et al. |
| 9,429,906 | B2 | 8/2016 | Yoshimura et al. |

(Continued)

FOREIGN PATENT DOCUMENTS

| | | |
|---|---|---|
| CN | 1391142 A | 1/2003 |
| CN | 209215875 U | 8/2019 |

(Continued)

*Primary Examiner* — Sophia S Chen
(74) *Attorney, Agent, or Firm* — IPro, PLLC

(57) ABSTRACT

Disclosed in the present disclosure is a process cartridge that has: a frame with a developing frame and a drum frame; a developing roller supported on the developing frame; a photosensitive drum supported on the drum frame; and a first coupling provided at a first end of the frame in a first direction, and being capable of receiving a driving force from the outside of the process cartridge to transmit the driving force to the developing roller. A driving side cover is provided at one end of the drum frame in the first direction, a first avoidance opening is provided in the driving side cover to expose the first coupling to the outside of the process cartridge, and the first avoidance opening is communicated with the outside of the process cartridge in a direction perpendicular to the first direction.

19 Claims, 29 Drawing Sheets

(56) References Cited

U.S. PATENT DOCUMENTS

| | | | | |
|---|---|---|---|---|
| 11,460,802 | B2 | 10/2022 | Yoshimura et al. | |
| 2013/0051847 | A1* | 2/2013 | Kamimura ......... | G03G 21/1821 399/111 |
| 2014/0003841 | A1* | 1/2014 | Kobayashi ......... | G03G 21/1821 399/167 |
| 2025/0013194 | A1 | 1/2025 | Zhong et al. | |

FOREIGN PATENT DOCUMENTS

| | | | |
|---|---|---|---|
| CN | 212515363 | U | 2/2021 |
| CN | 213338329 | U | 6/2021 |
| CN | 214122699 | U | 9/2021 |
| CN | 220491185 | U | 2/2024 |
| CN | 221573024 | U | 8/2024 |
| DE | 212023000141 | U1 | 10/2024 |

* cited by examiner

PROCESS CARTRIDGE

TECHNICAL FIELD

The present disclosure relates to the technical field of electrophotographic imaging, and in particular to a process cartridge.

BACKGROUND

In an image forming device, a process apparatus (i.e., a developing cartridge) that can act on a photosensitive drum, and the photosensitive drum are integrated into a cartridge. The cartridge is detachably mounted on the image forming device. According to the type of the cartridge, maintenance operations on the apparatus may be performed by a user without having to rely on service personnel, thereby significantly improving operability, so that this cartridge type is widely used in image forming devices.

A process cartridge may include a developing unit and a drum unit connected to each other. The developing unit includes a developing frame that can accommodate developer, a developing roller and a supply roller rotatably supported on the developing frame, a developing roller gear and a supply roller gear which are arranged at one end of the developing roller and one end of the supply roller, respectively, a first coupling that can drive the developing roller gear and the supply roller gear, and a bearing cover that can also cover at least a part of the first coupling and the developing roller gear and the supply roller gear. The drum unit includes a drum frame that can accommodate waste developer, a photosensitive drum rotatably supported on the drum frame, and a second coupling that is arranged at one end of the photosensitive drum and can drive the photosensitive drum to rotate. A cover is also provided at one end of the process cartridge in the length direction. The cover is integrally formed with the drum frame, and a pair of exposure holes are provided in the cover. The first coupling and the second coupling can pass through the pair of exposure holes to be exposed to the outside of the process cartridge, respectively, which is convenient for the two to receive driving force in the image forming device.

In the assembly process of the process cartridge, on the one hand, various components may be assembled one by one, but this assembly method significantly reduces the assembling efficiency of the process cartridge; on the other hand, after the developing unit and the drum unit are assembled separately, the developing unit is assembled to the drum unit. However, since the developing roller connecting portion of the developing unit needs to pass through the cover to be supported and exposed to the outside, the developing unit may interfere with the cover of the drum unit in the length direction of the developing unit, making it difficult to mount them. The developing unit may be assembled to the drum unit in an assembling manner of first tilting and then straightening. However, this assembling manner will also reduce the assembling efficiency of the process cartridge.

SUMMARY

The present disclosure provides a process cartridge, comprising: a frame, with a first end and a second end separated from each other in a first direction, and comprising a developing frame and a drum frame; a developing roller supported on the developing frame and being rotatable about a developing roller rotation axis extending along the first direction; a photosensitive drum supported on the drum frame and being rotatable about a photosensitive drum rotation axis; a first coupling at the first end of the frame, and configured to rotate the developing roller; a second coupling at the first end of the frame, and configured to rotate the photosensitive drum; a chip having an electrical contact surface; and a driving side cover at a first end of the drum frame in the first direction, comprising a through hole and a first avoidance opening. At least a portion of the second coupling extends and is exposed through the through hole, at least a portion of the first coupling extends and is exposed through the first avoidance opening, and the first avoidance opening is partially unenclosed in a plane perpendicular to the first direction. When the process cartridge is oriented such that the photosensitive drum is at a bottom of the process cartridge and the photosensitive drum rotation axis is lower than the developing roller rotation axis, the electrical contact surface is higher than the first coupling and the second coupling, and at least a portion of the first avoidance opening is higher than the photosensitive drum.

The process cartridge may further comprise a connecting portion connecting the developing frame and the drum frame. The connecting portion comprises a first connecting portion at a first end of the developing frame in the first direction and a second connecting portion at a second end of the developing frame in the first direction, and an orthographic projection of the first connecting portion onto the plane is does not overlap an orthographic projection of the first coupling onto the plane.

In an aspect, an orthographic projection of the second connecting portion onto the plane overlaps the orthographic projection of the first coupling.

In an aspect, the second connecting portion is a metal pin.

In an aspect, the first coupling being rotatable about a rotation axis extending along the first direction, at least a part of the first connecting portion is higher than the rotation axis of the first coupling.

The process cartridge may further comprise a bearing cover at a first end of the developing frame in the first direction. The bearing cover covers at least a portion of the first coupling, the bearing cover comprises a second avoidance opening partially unenclosed in the plane, and the first coupling extends sequentially through the second avoidance opening and the first avoidance opening and is exposed to the outside of the process cartridge.

In an aspect, the process cartridge further comprises a non-driving side cover at a second end of the drum frame, the non-driving side cover comprising a third avoidance opening partially unenclosed in the plane. The process cartridge further comprises an electrode component at the second end of the frame, and at least a portion of the electrode component extends through the third avoidance opening and is exposed to the outside of the process cartridge.

In an aspect, the process cartridge further comprises a non-driving side cover at a second end of the drum frame, a developer filling port at a first end of the developing frame in the first direction and a sealing cover on the developer filling port. The non-driving side protective cover is farther away in the first direction from the first end of the frame than the developer filling port. An orthographic projection of the developer filling port onto a plane perpendicular to the first direction overlaps an orthographic projection of the non-driving side protective cover onto the plane.

In an aspect, the through hole comprises accommodating grooves for accommodating a lubricant in an inner wall of the through hole, and the accommodating grooves are recessed into the inner wall in a radial direction of the through hole.

Also disclosed herein is a process cartridge, comprising: a frame with a first end and a second end separated from each other in a first direction, and comprising a developing frame and a drum frame; a developing roller supported on the developing frame and being rotatable about a developing roller rotation axis extending along the first direction; a photosensitive drum supported on the drum frame and being rotatable about a photosensitive drum rotation axis; a first coupling at the first end of the frame, and configured to rotate the developing roller; a protrusion operatively connected to the developing frame and is configured to move the developing frame; and a driving side cover at a first end of the drum frame in the first direction, comprising a first avoidance opening, at least a portion of the first coupling extends and is exposed through the first avoidance opening, and the first avoidance opening is partially unenclosed in a plane perpendicular to the first direction. The developing frame and the drum frame are connected together through a connecting portion, and the connecting portion comprises a first connecting portion at a first end of the developing frame in the first direction and a second connecting portion located at a second end of the developing frame in the first direction. An orthographic projection of the first connecting portion onto the plane does not overlap an orthographic projection of the first coupling onto the plane, and an orthographic projection of the second connecting portion onto the plane at least partially overlaps an orthographic projection of the first coupling onto the plane. When the process cartridge is oriented such that the photosensitive drum is at a bottom of the process cartridge and the photosensitive drum rotation axis is lower than the developing roller rotation axis, the protrusion is lower than the first connecting portion.

In an aspect, at least a part of the protrusion is movable in an up-down direction of the process cartridge.

In an aspect, at least a part of the first connecting portion is higher than a rotation axis of the first coupling.

In an aspect, the drum frame has a groove matched with the first connecting portion, the developing frame and the drum frame are connected together by the first connecting portion and the groove, the first connecting portion is movable in the groove, and the protrusion is lower than the first connecting portion and the groove.

The process cartridge may further comprise a bearing cover at the first end of the frame and covering at least a portion of the first coupling. The first connecting portion is a boss on the bearing cover.

The process cartridge may further comprise a second coupling at one end of the photosensitive drum and a through hole at the first end of the frame. At least a portion of the second coupling extends through the through hole and is supported therein, and the through hole has an accommodating groove for accommodating a lubricant in an inner wall of the through hole, and the accommodating groove is recessed from the inner wall in a radial direction of the through hole.

Also disclosed herein is a process cartridge, comprising: a frame, with a first end and a second end separated from each other in a first direction, and comprising a developing frame and a drum frame; a developing roller supported on the developing frame and being rotatable about a developing roller rotation axis extending along the first direction; a photosensitive drum supported on the drum frame; a first coupling at the first end of the frame, and configured to rotate the developing roller; a second coupling at an end of the photosensitive drum in the first direction, and configured to rotate the photosensitive drum; a chip having an electrical contact surface; and a driving side cover at a first end of the drum frame in the first direction, comprising a through hole and a first avoidance opening. At least a portion of the second coupling extends and is exposed through the through hole, the through hole comprises an accommodating groove recessed into an inner wall of the through hole in a radial direction of the through hole and for accommodating a lubricant. At least a portion of the first coupling extends and is exposed through the first avoidance opening, and the first avoidance opening is partially unenclosed in a plane perpendicular to the first direction.

The process cartridge may further comprise a first connecting portion at a first end of the developing frame in the first direction and a groove in the drum frame. The developing frame and the drum frame are connected to each other by the first connecting portion and the groove, and the first connecting portion is movable in the groove.

In an aspect, when the process cartridge is oriented such that the photosensitive drum is at a bottom of the process cartridge and the photosensitive drum rotation axis is lower than the developing roller rotation axis, at least a part of the first connecting portion is higher than a rotation axis of the first coupling.

In an aspect, the process cartridge further comprises a non-driving side cover at a second end of the drum frame in the first direction, the non-driving side cover comprising a third avoidance opening partially unenclosed in the plane. The process cartridge further comprises an electrode component at the second end of the frame and electrically connected to the developing roller, and at least a portion of the electrode component extends and is exposed through the third avoidance opening to an outside of the process cartridge.

In one aspect, by arranging the bearing cover on the drum frame of the drum unit, the parts can be transported and stored in the form of assemblies during transportation, which is convenient for subsequent management and assembly of the process cartridge. Alternatively, the arrangement in which the bearing cover is integrally formed with the drum frame can reduce the number of molds used, that is, one set of molds can be used for production, which reduces the production cost and simplifies the assembling steps of the process cartridge.

In another aspect, by eliminating the holes in the bearing cover and the driving side cover, other places are used for support and positioning, so that while the material used for manufacturing the bearing cover and the driving side cover is reduced and the production cost is reduced, the developing unit can be mounted along a direction intersecting with the length direction of the process cartridge without being blocked when assembling the process cartridge, thereby greatly improving the assembling speed and efficiency of the process cartridge.

In further another aspect, by setting the fulcrum closer to the rotation axis of the developing roller, the length of the power arm is increased and the length of the resistance arm is reduced. On the premise of ensuring the developer conveying effect from the developing roller to the photosensitive drum, the required pressure value between the developing roller and the photosensitive drum can be met with a smaller elastic force, which is more helpful to accurately control the pressure between the developing roller and the photosensitive drum, and avoids the problem that the elastic force of the elastic member is set excessively large to squeeze the developing frame and the drum frame, causing them to deform and damage, thereby affecting the service life of the process cartridge.

DETAILED DESCRIPTION

Embodiment 1

Figure 1:
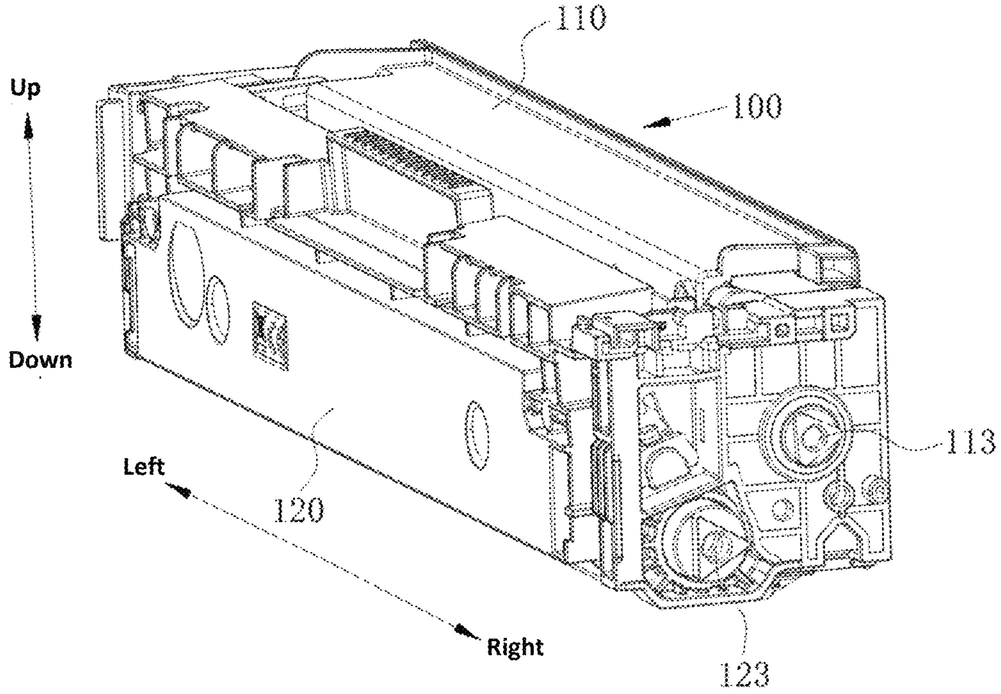
FIG. 1 is a schematic view of a process cartridge in Embodiment 1 of the present disclosure from a first viewing angle.
Figure 2:
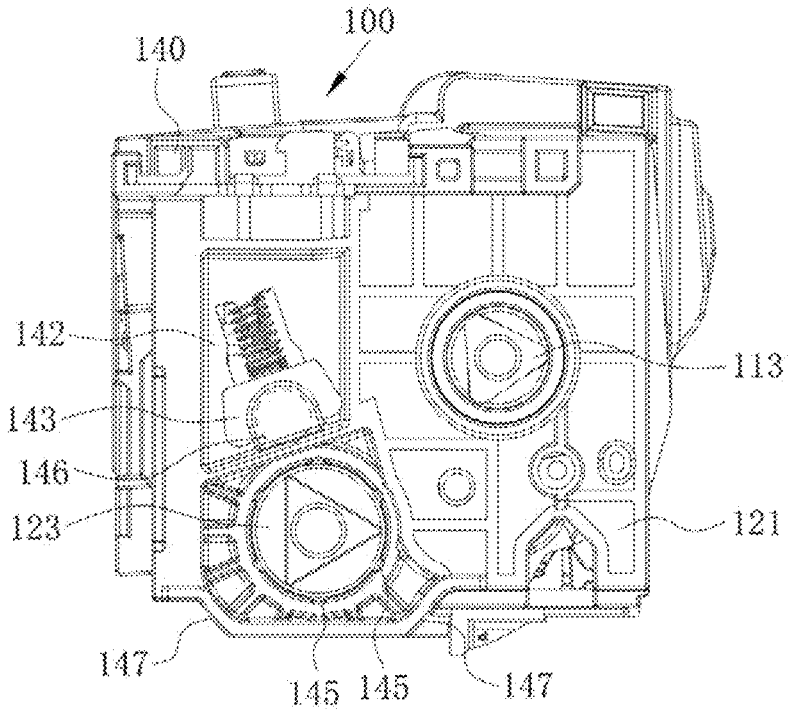
FIG. 2 is a schematic view of the process cartridge in Embodiment 1 of the present disclosure from a second viewing angle.
Figure 3:
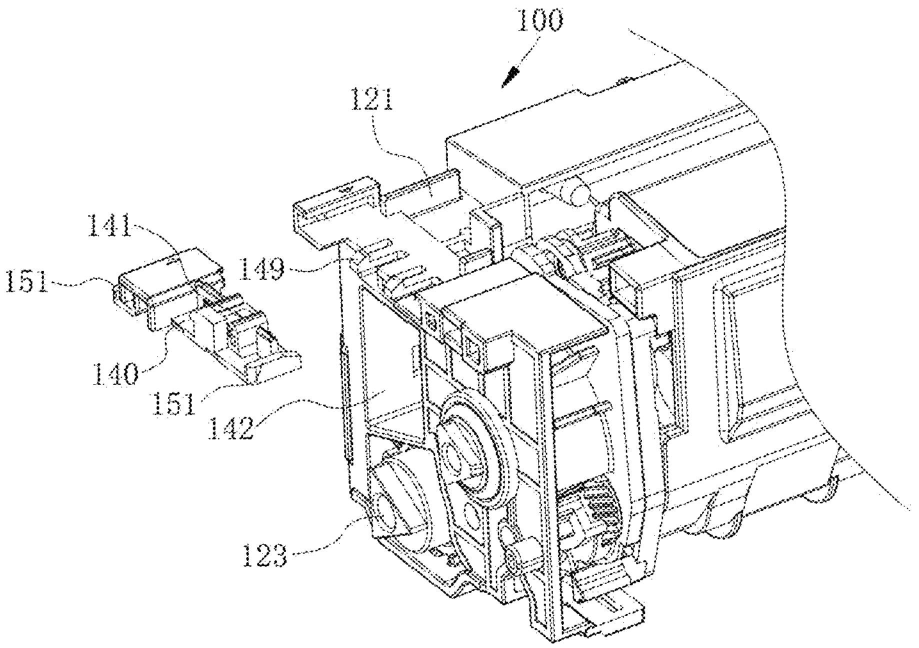
FIG. 3 is a schematic view of the process cartridge in Embodiment 1 of the present disclosure from a third viewing angle.
Figure 4:
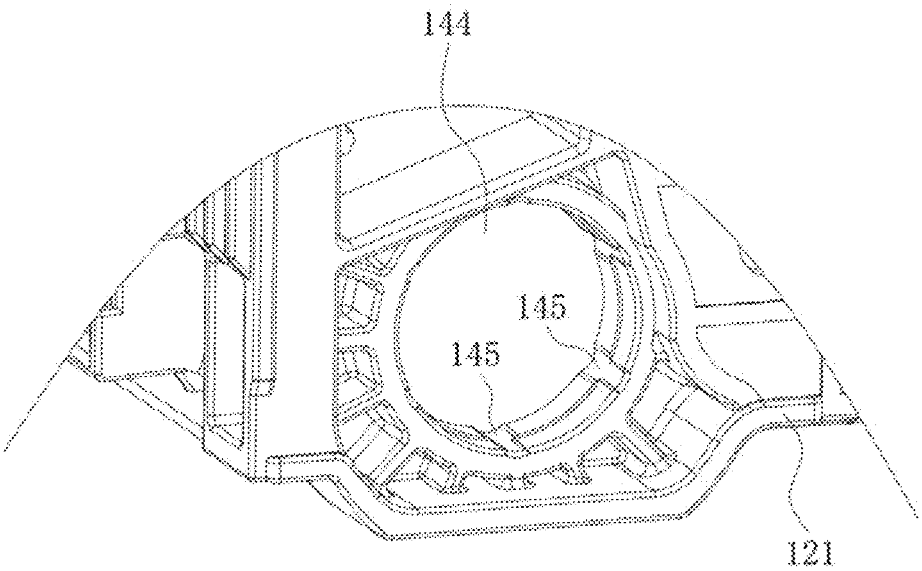
FIG. 4 is a schematic view of a part of the process cartridge in Embodiment 1 of the present disclosure from the first viewing angle.
Figure 5:
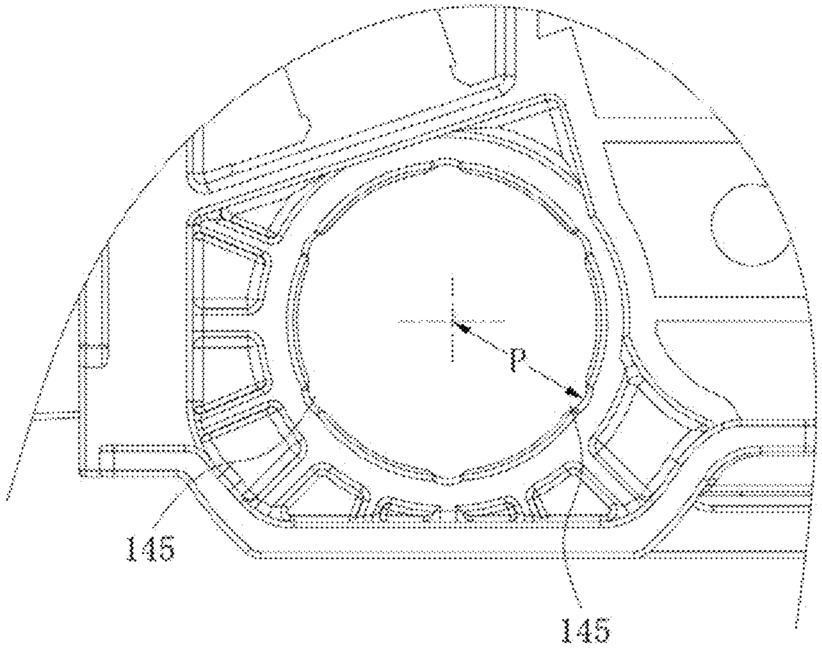
FIG. 5 is a schematic view of a part of the process cartridge in Embodiment 1 of the present disclosure from the second viewing angle.
Figure 6:
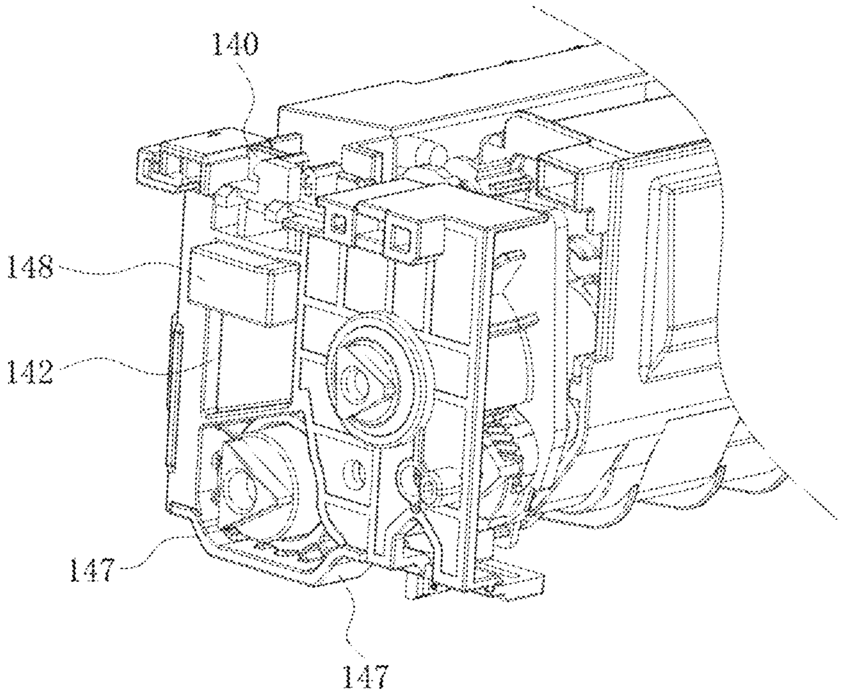
FIG. 6 is a schematic view of a separator mounted in the process cartridge in Embodiment 1 of the present disclosure.
Figure 7:
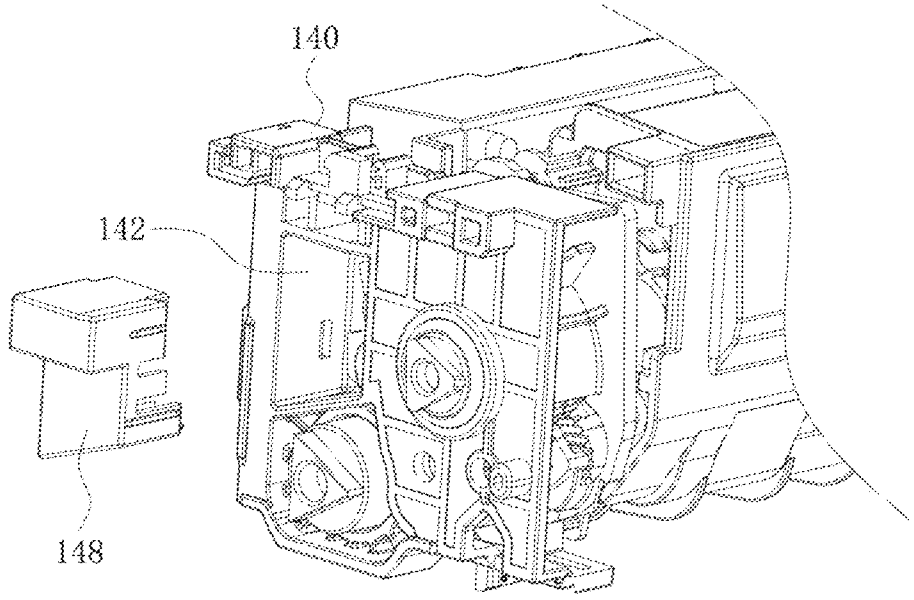
FIG. 7 is a schematic view of the separator removed from the process cartridge in Embodiment 1 of the present disclosure.
Figure 8:
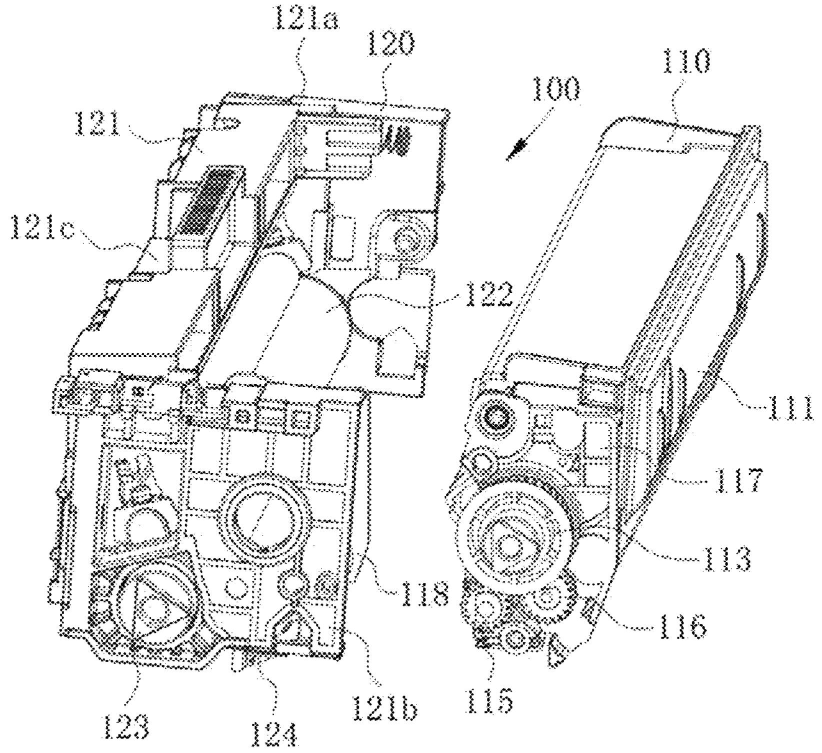
FIG. 8 is a schematic view of the separation of a developing unit and a drum unit in Embodiment 1 of the present disclosure.
Figure 9:
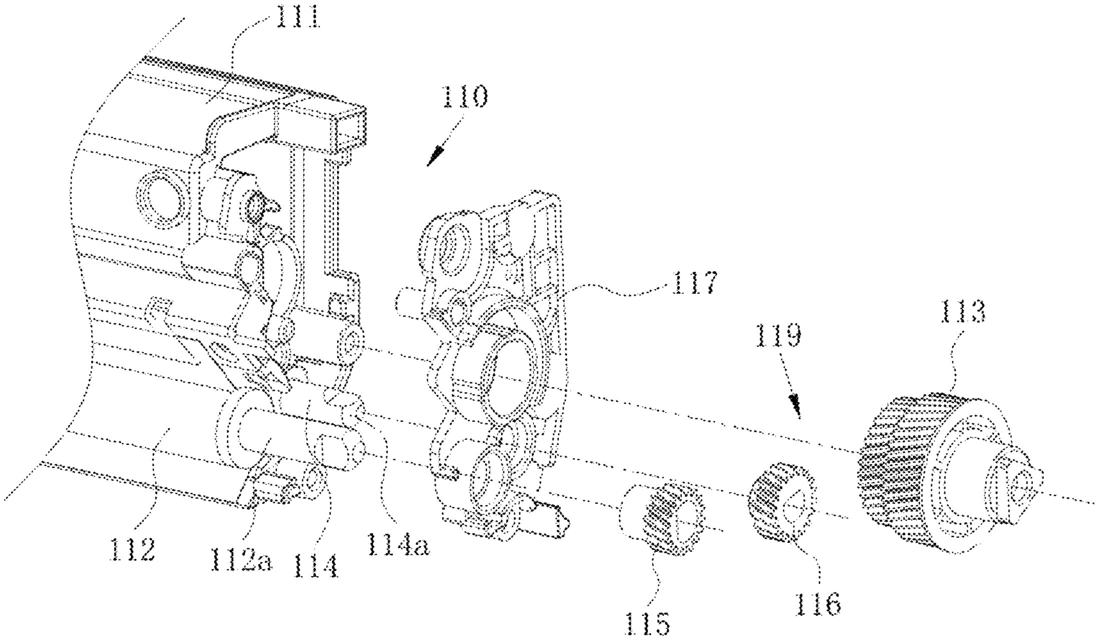
FIG. 9 is an exploded schematic view of the developing unit in Embodiment 1 of the present disclosure from the first viewing angle.
Figure 10:
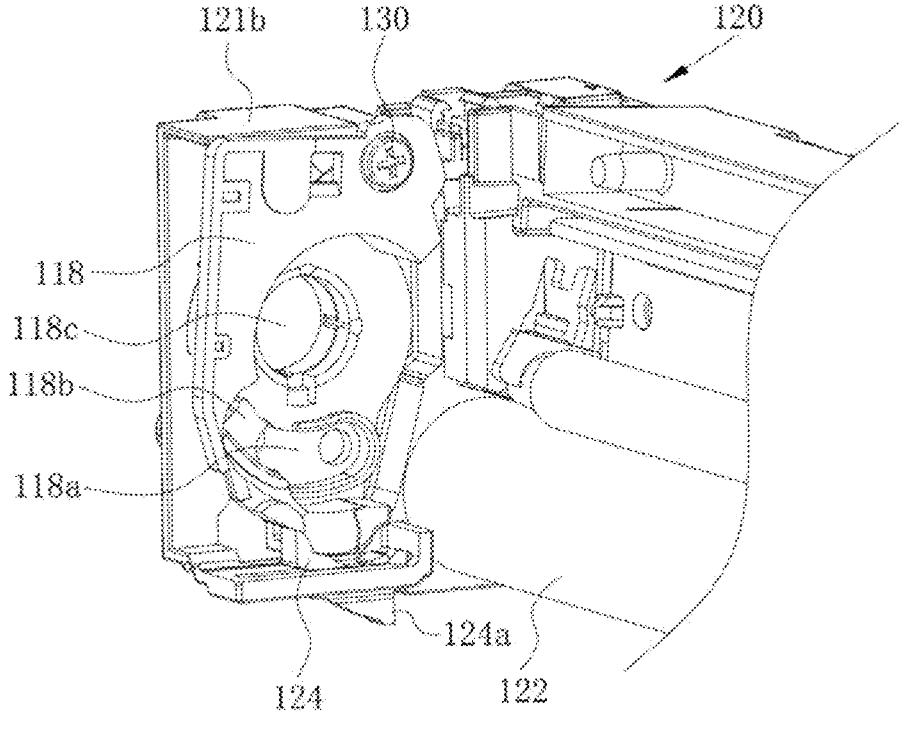
FIG. 10 is a schematic view of the drum unit in Embodiment 1 of the present disclosure.
Figure 11:
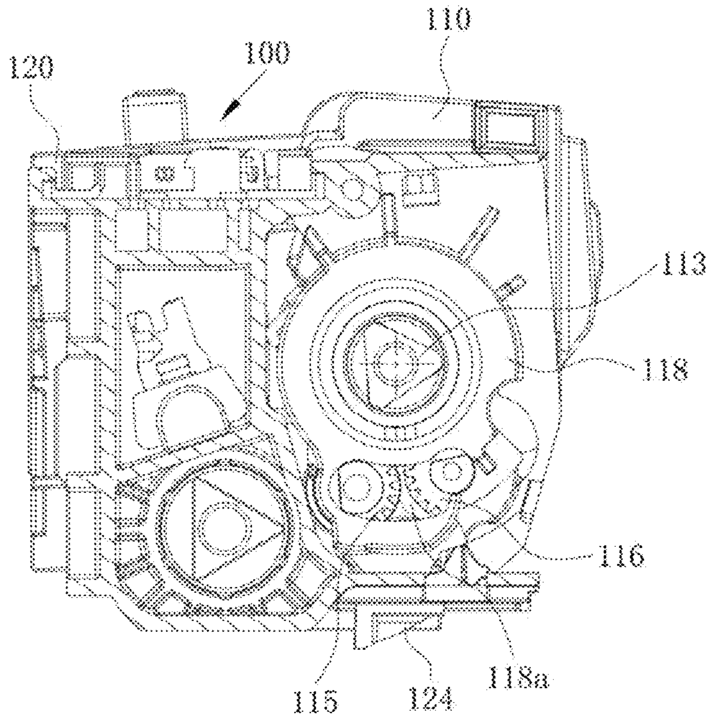
FIG. 11 is a schematic view of the process cartridge in Embodiment 1 of the present disclosure when the developing roller and the photosensitive drum are in contact with each other.
Figure 12:
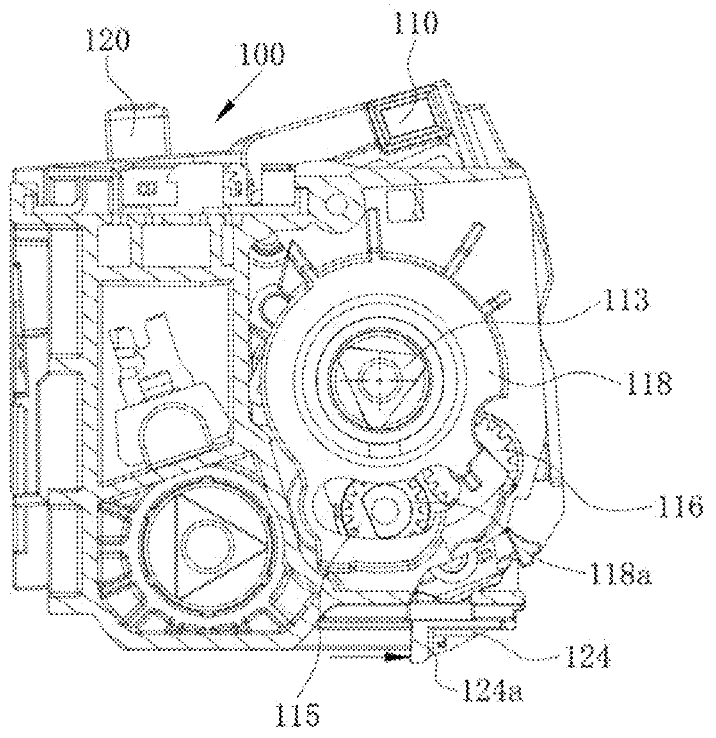
FIG. 12 is a schematic view of the process cartridge in Embodiment 1 of the present disclosure when the developing roller and the photosensitive drum are separated from each other.
Figure 13:
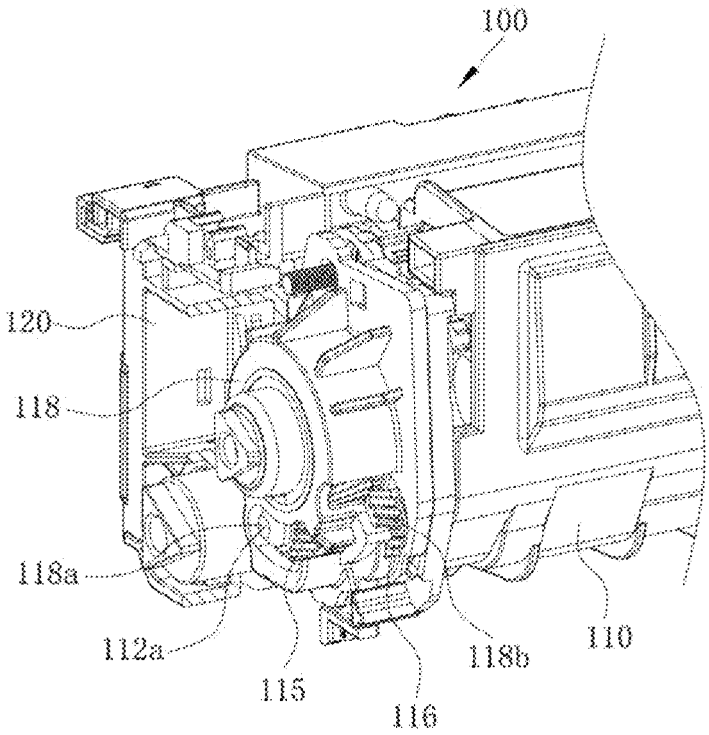
FIG. 13 is a schematic view of the process cartridge in Embodiment 1 of the present disclosure with a partial cross-section of the drum frame.
Figure 14:
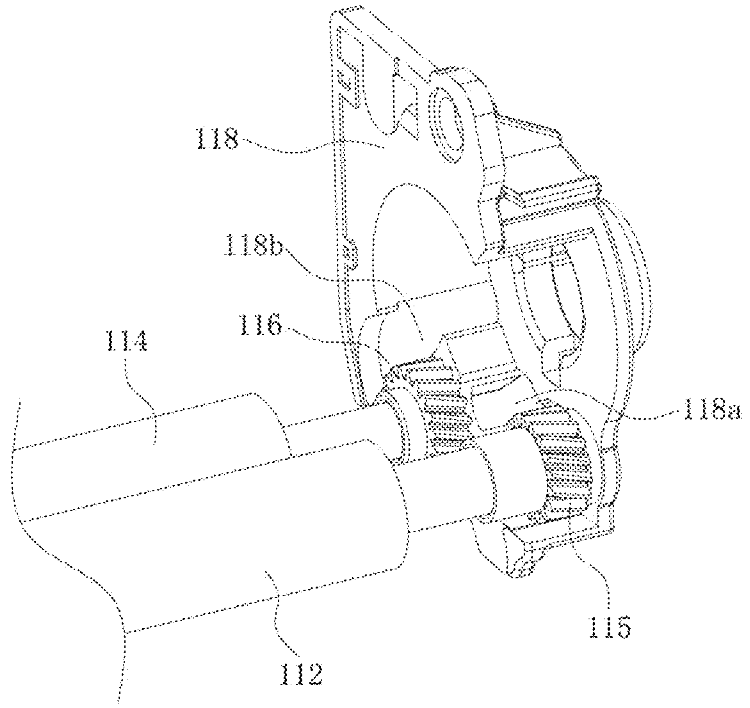
FIG. 14 is a schematic view of a developing roller gear and a supply roller gear in Embodiment 1 of the present disclosure when they are mounted on a bearing cover.
Figure 15:
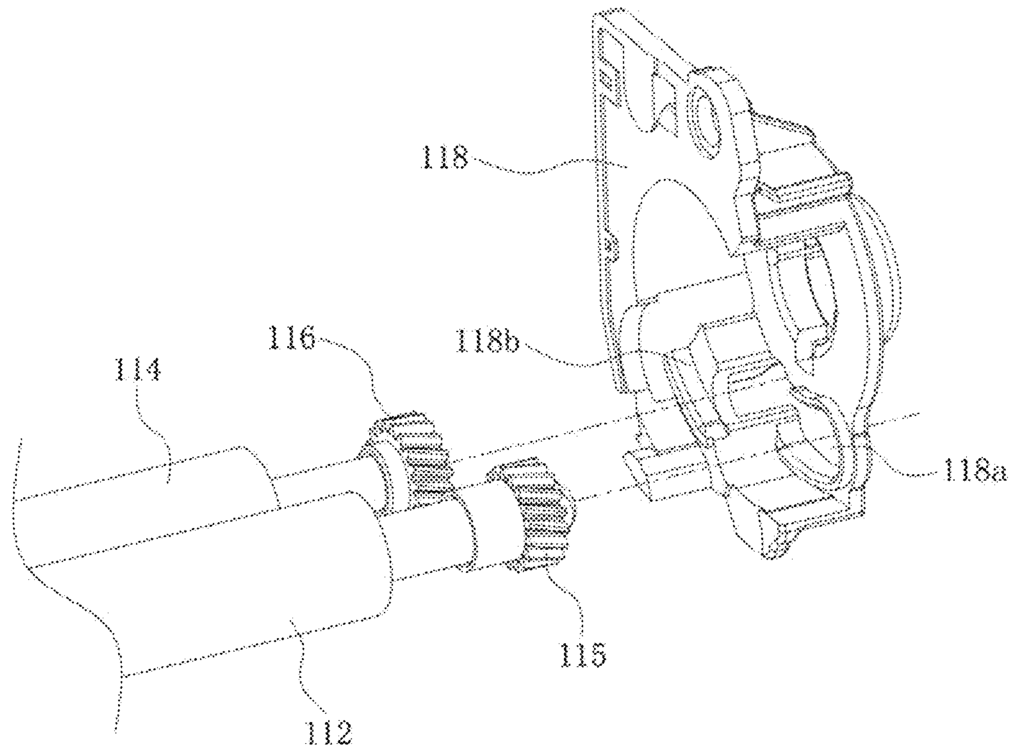
FIG. 15 is a schematic view of the developing roller gear and the supply roller gear in Embodiment 1 of the present disclosure when they are detached from the bearing cover.
Figure 16:
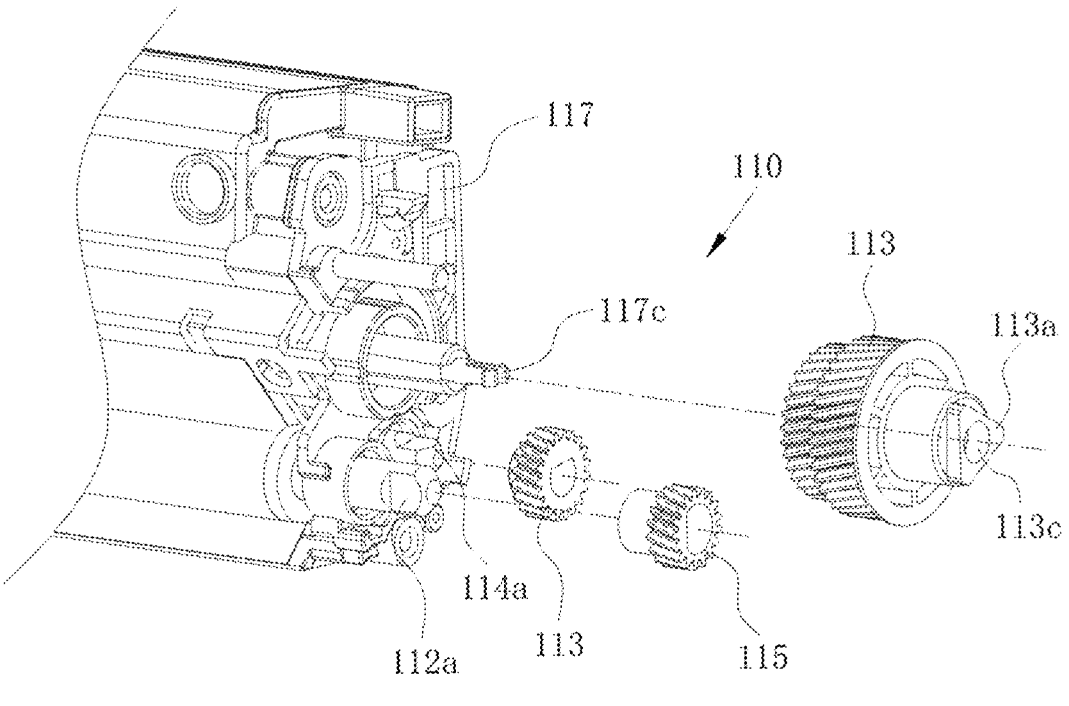
FIG. 16 is an exploded schematic view of the developing unit in Embodiment 1 of the present disclosure from the second viewing angle.
Figure 17:
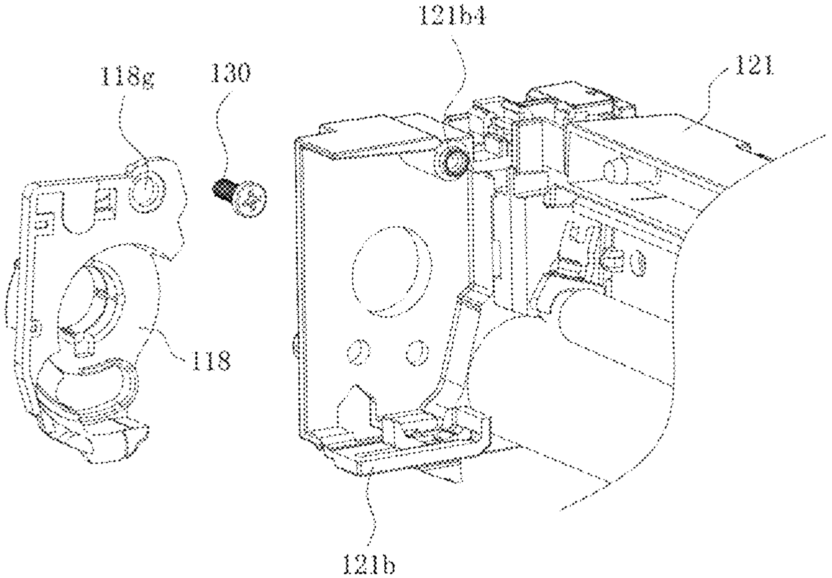
FIG. 17 is an exploded schematic view of the drum frame and a gear cover in Embodiment 1 of the present disclosure.
Figure 18:
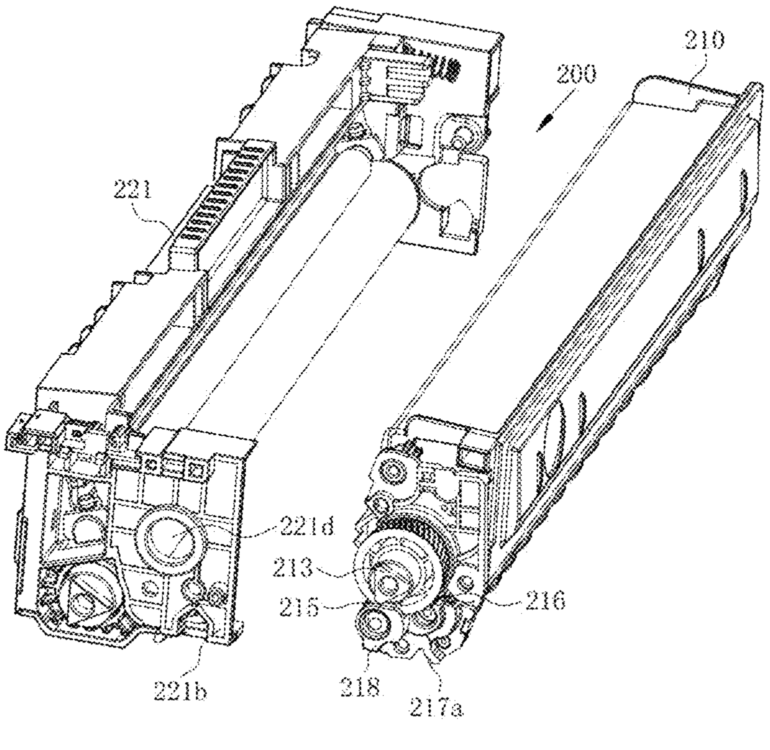
FIG. 18 is a schematic view of the separation of a developing unit and a drum unit in Embodiment 2 of the present disclosure.
Figure 19:
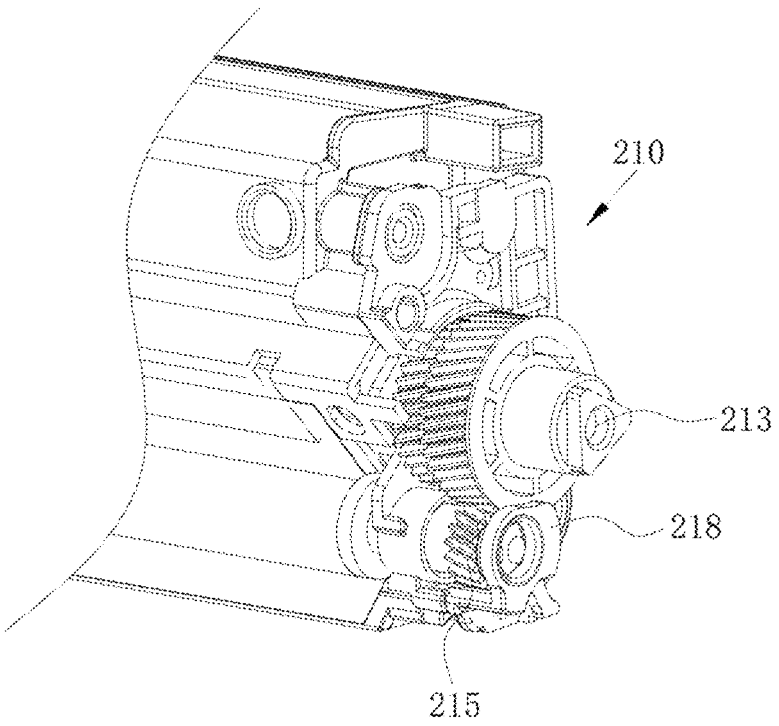
FIG. 19 is a schematic view of the developing unit in Embodiment 2 of the present disclosure from a first viewing angle.
Figure 20:
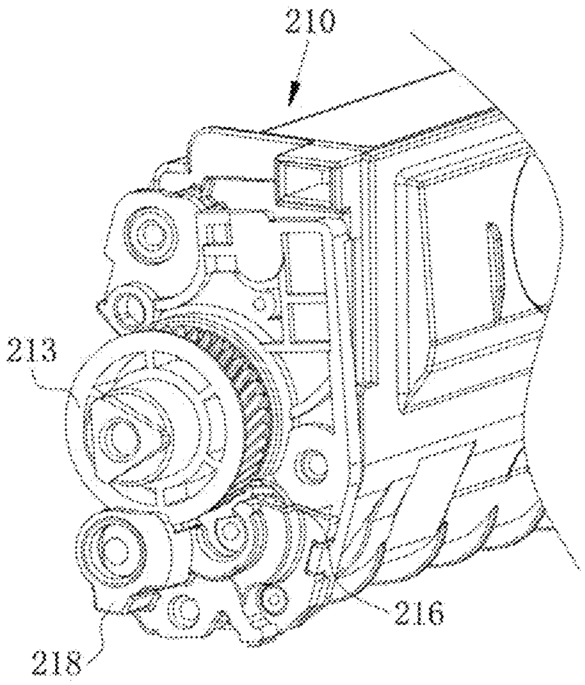
FIG. 20 is a schematic view of the developing unit in Embodiment 2 of the present disclosure from a second viewing angle.
Figure 21:
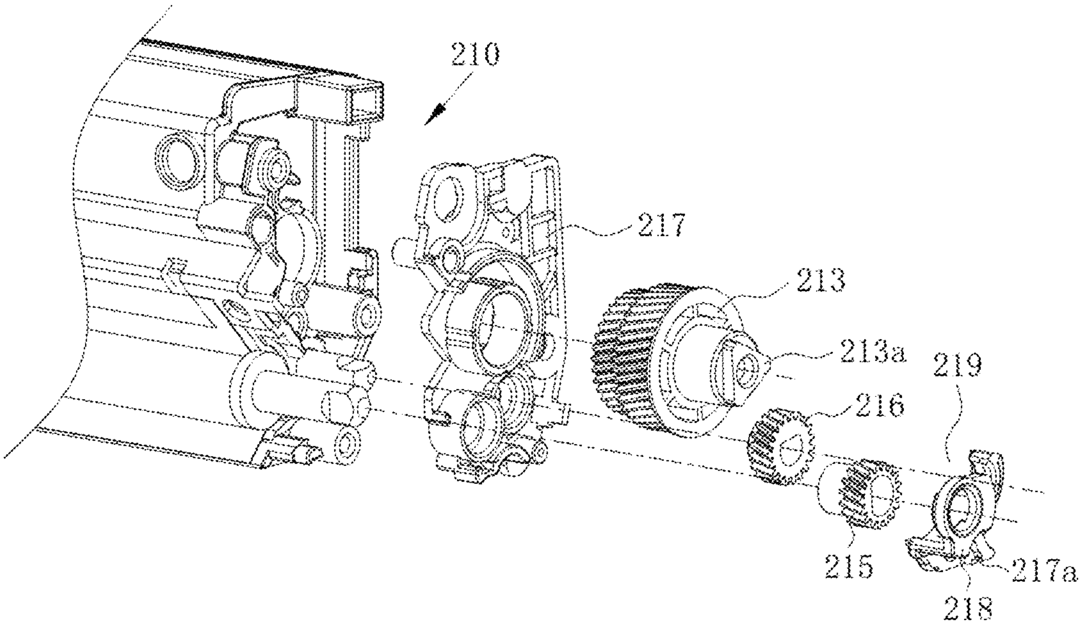
FIG. 21 is an exploded schematic view of the developing unit in Embodiment 2 of the present disclosure.
Figure 22:
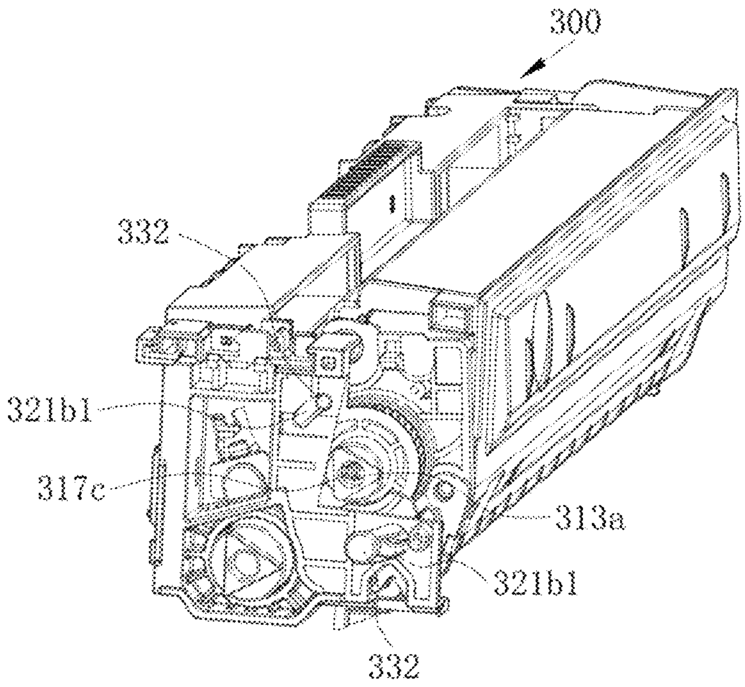
FIG. 22 is a schematic view of a process cartridge in Embodiment 3 of the present disclosure from a first viewing angle.
Figure 23:
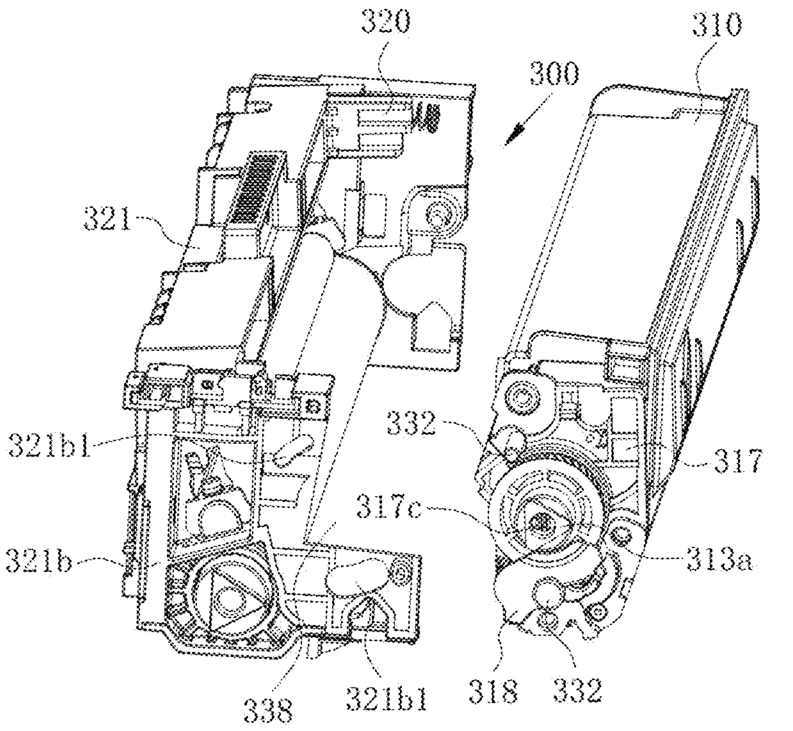
FIG. 23 is a first exploded schematic view of a developing unit and a drum unit in Embodiment 3 of the present disclosure.
Figure 24:
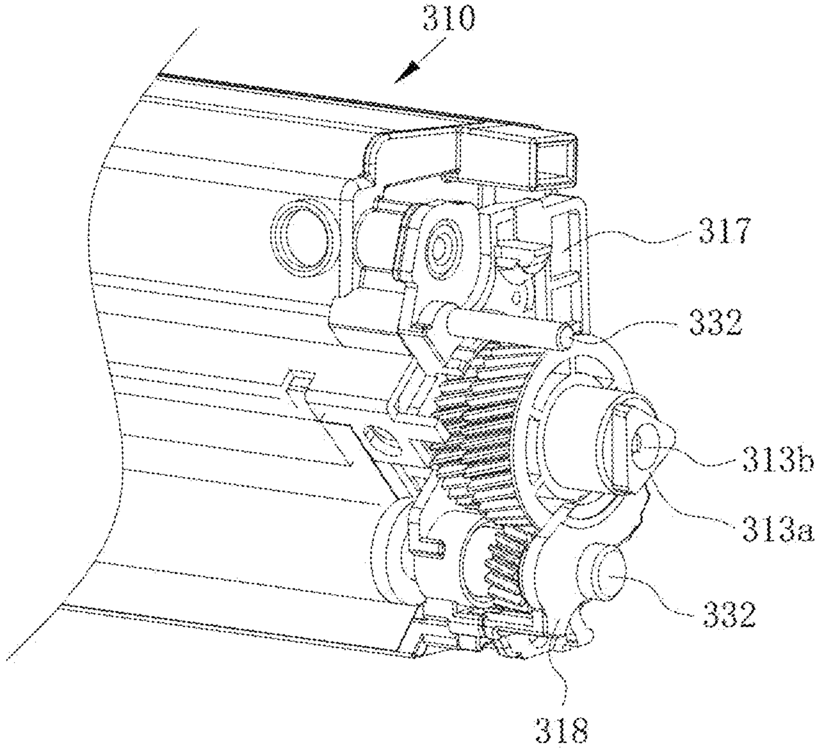
FIG. 24 is a schematic view of the developing unit in Embodiment 3 of the present disclosure.
Figure 25:
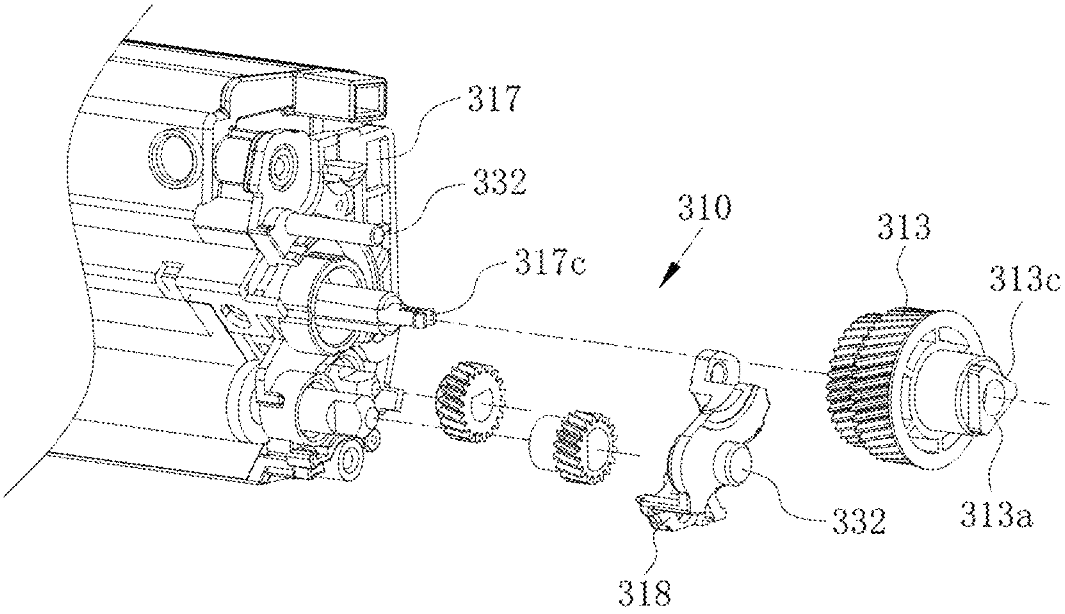
FIG. 25 is an exploded schematic view of the developing unit in Embodiment 3 of the present disclosure from the first viewing angle.
Figure 26:
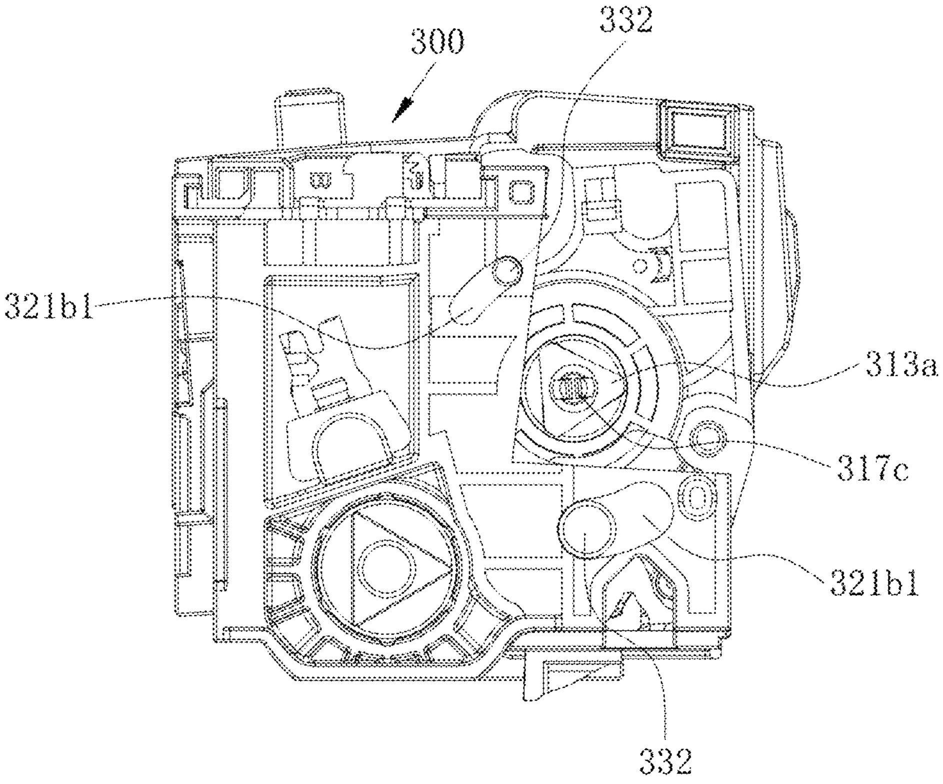
FIG. 26 is a schematic view of the process cartridge in Embodiment 3 of the present disclosure when a developing roller is in contact with a photosensitive drum.
Figure 27:
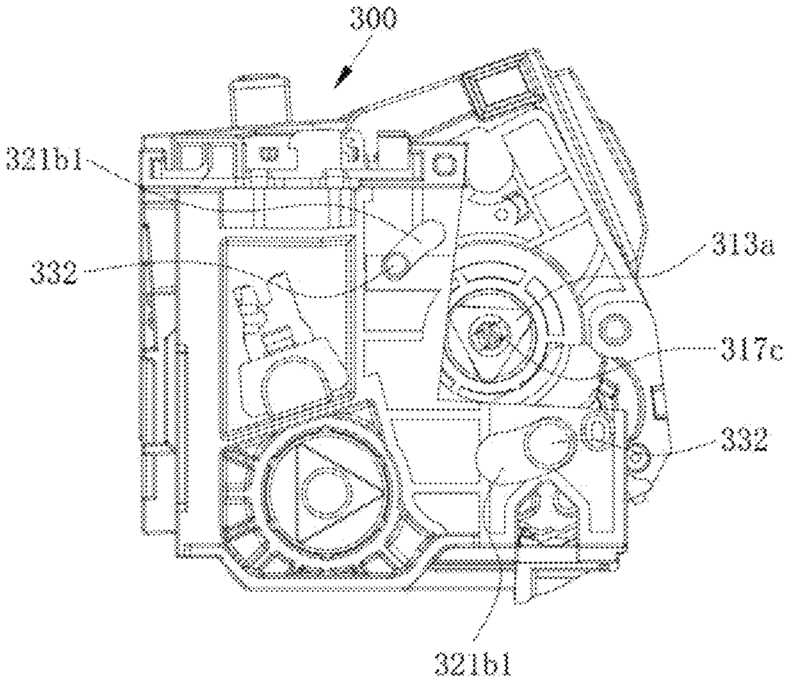
FIG. 27 is a schematic view of the process cartridge in Embodiment 3 of the present disclosure when the developing roller is separated from the photosensitive drum.
Figure 28:
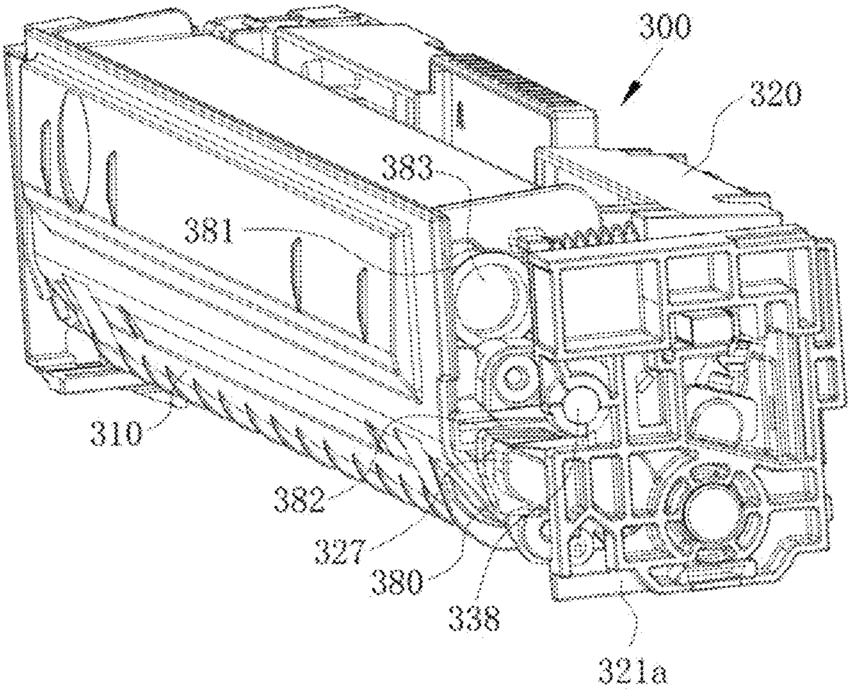
FIG. 28 is a schematic view of the process cartridge in Embodiment 3 of the present disclosure from a second viewing angle.
Figure 29:
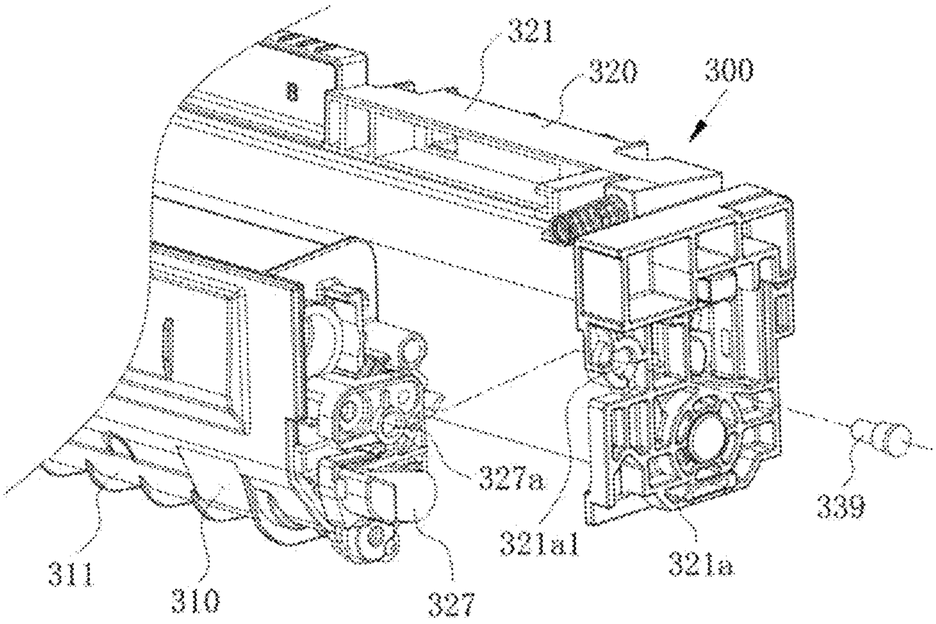
FIG. 29 is a second exploded schematic view of the developing unit and the drum unit in Embodiment 3 of the present disclosure.
Figure 30:
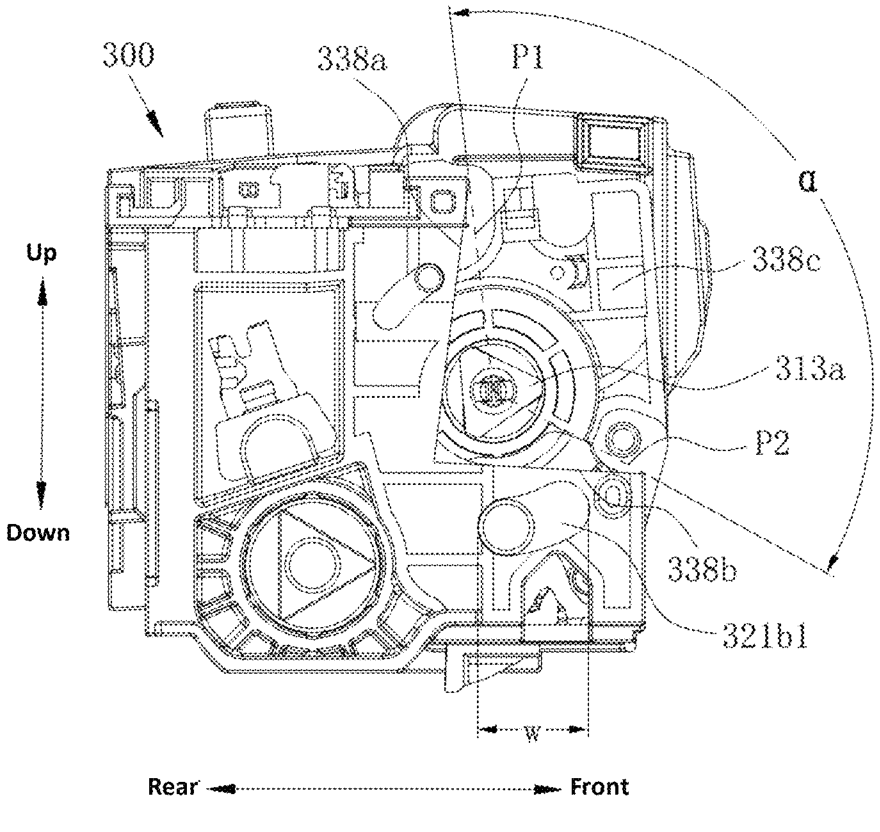
FIG. 30 is a schematic view of the process cartridge in Embodiment 3 of the present disclosure from a third viewing angle.
Figure 31:
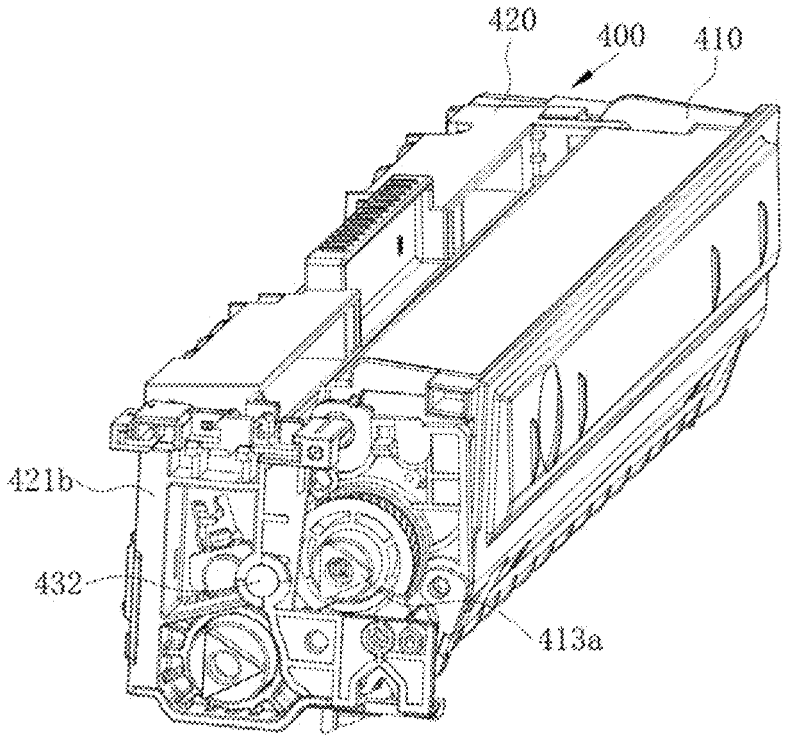
FIG. 31 is a schematic view of a process cartridge in Embodiment 4 of the present disclosure from a first viewing angle.
Figure 32:
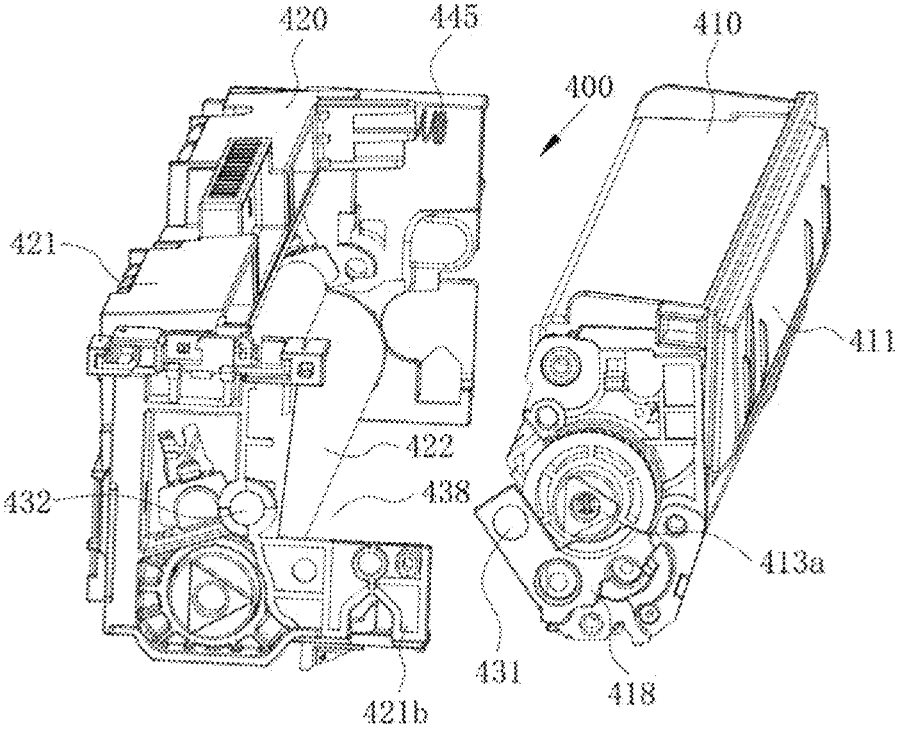
FIG. 32 is an exploded schematic view of a developing unit and a drum unit in Embodiment 4 of the present disclosure.
Figure 33:
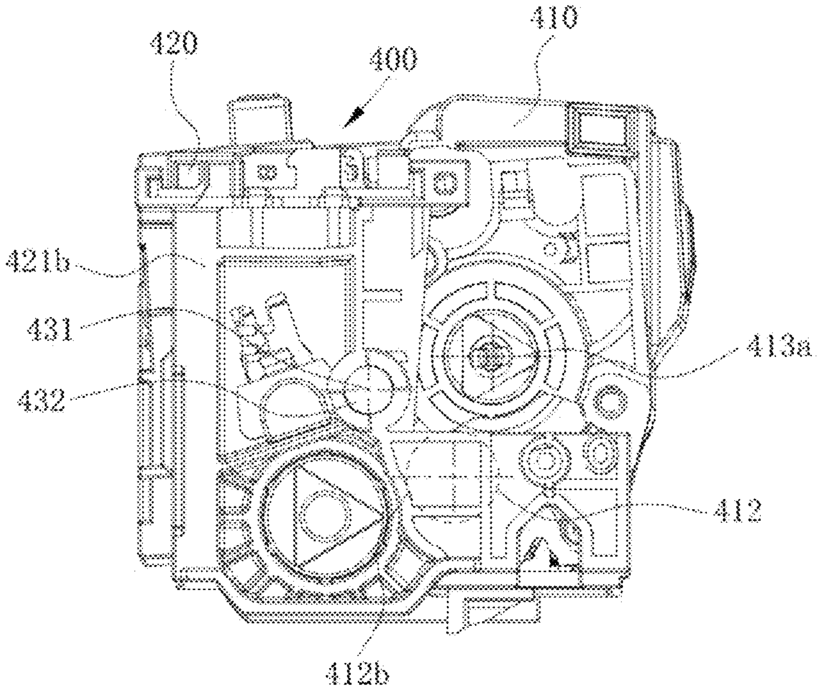
FIG. 33 is a schematic view of the process cartridge in Embodiment 4 of the present disclosure when a developing roller is in contact with a photosensitive drum.
Figure 34:
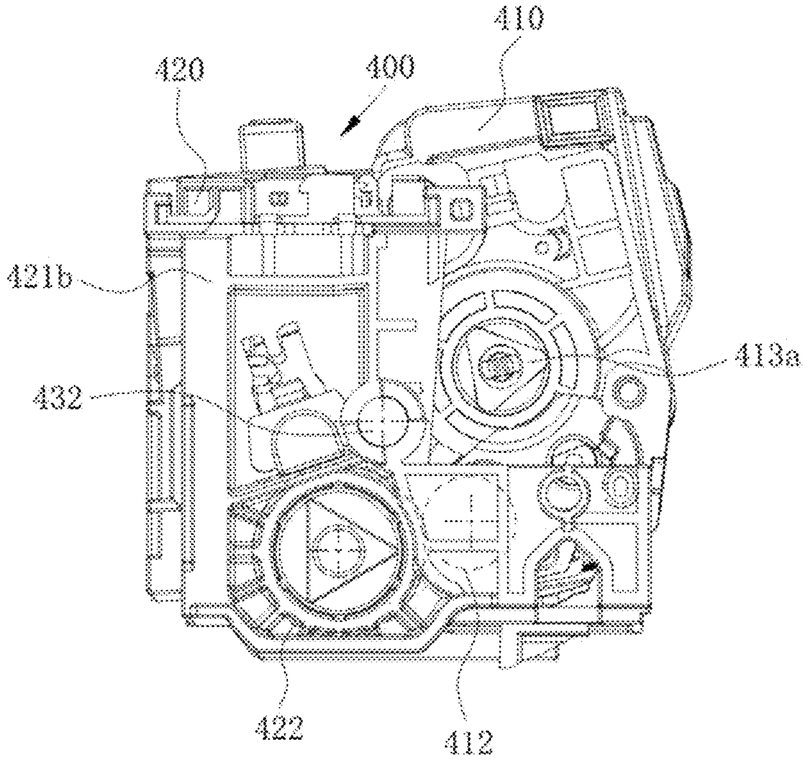
FIG. 34 is a schematic view of the process cartridge in Embodiment 4 of the present disclosure when the developing roller is separated from the photosensitive drum.
Figure 35:
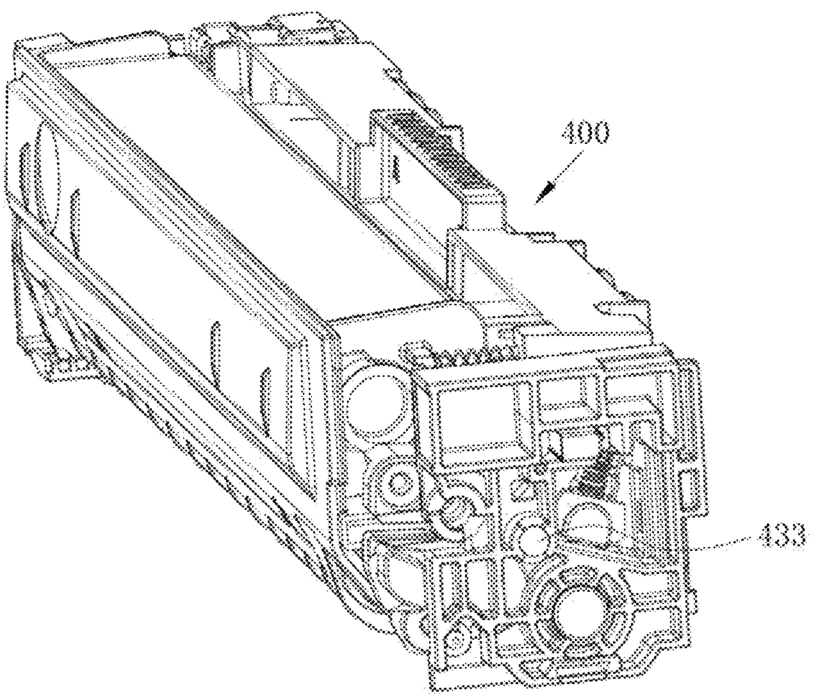
FIG. 35 is a schematic view of the process cartridge in Embodiment 4 of the present disclosure from a second viewing angle.
Figure 36:
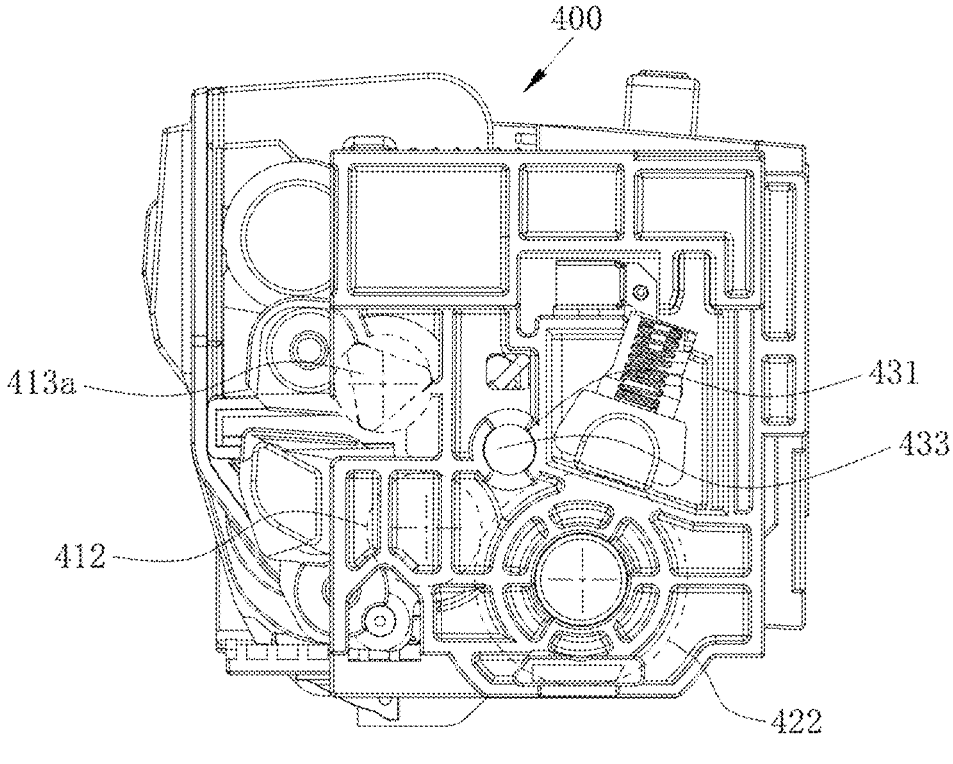
FIG. 36 is a schematic view of a left end of the process cartridge in Embodiment 4 of the present disclosure.
Figure 37:
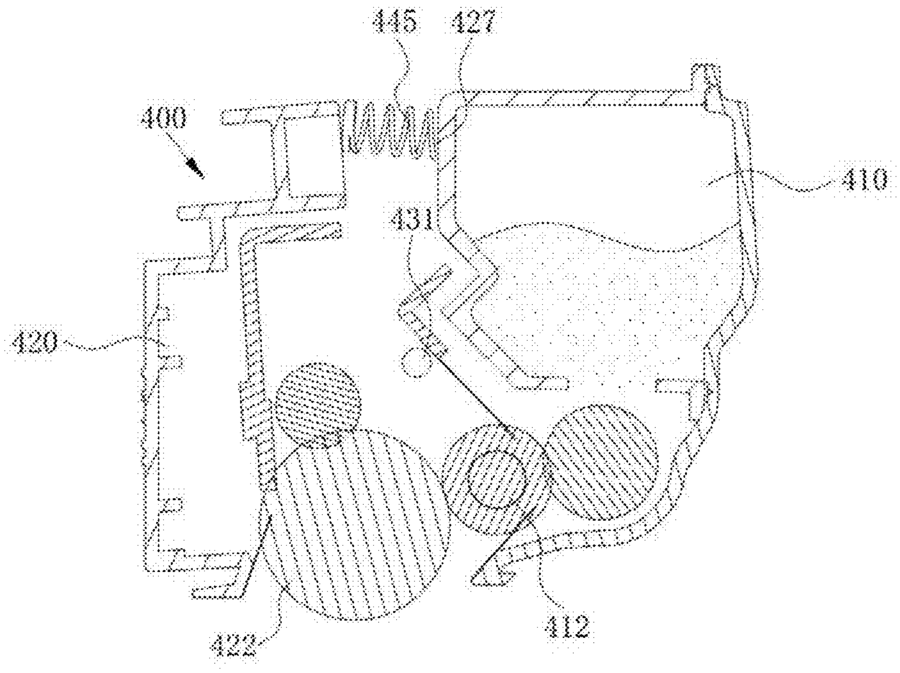
FIG. 37 is a schematic cross-sectional view of the process cartridge in Embodiment 4 of the present disclosure.
Figure 38:
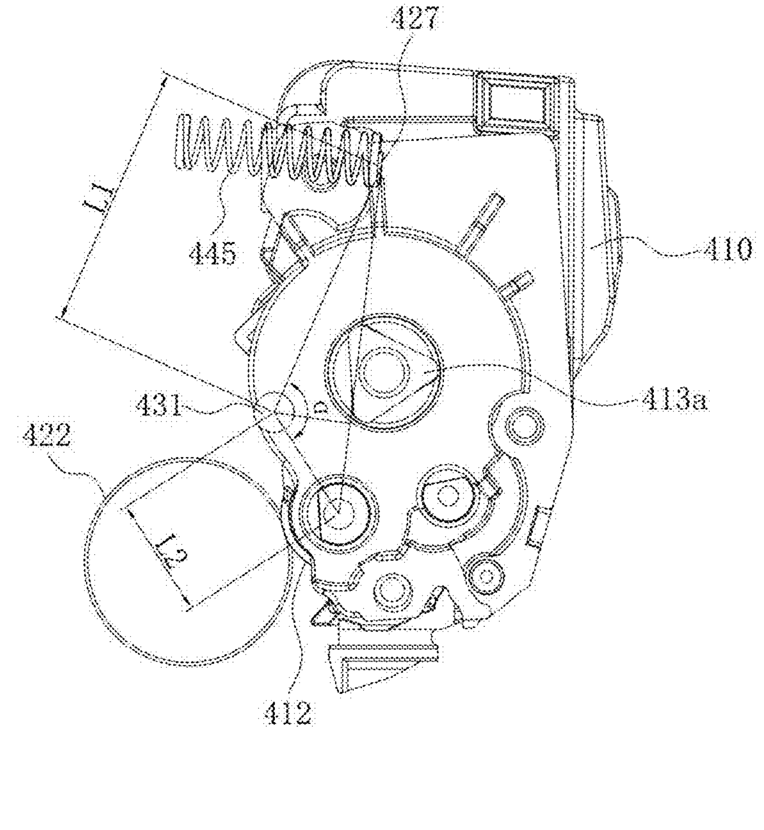
FIG. 38 is a schematic view of the developing unit of the process cartridge in Embodiment 4 of the present disclosure.
Figure 39:
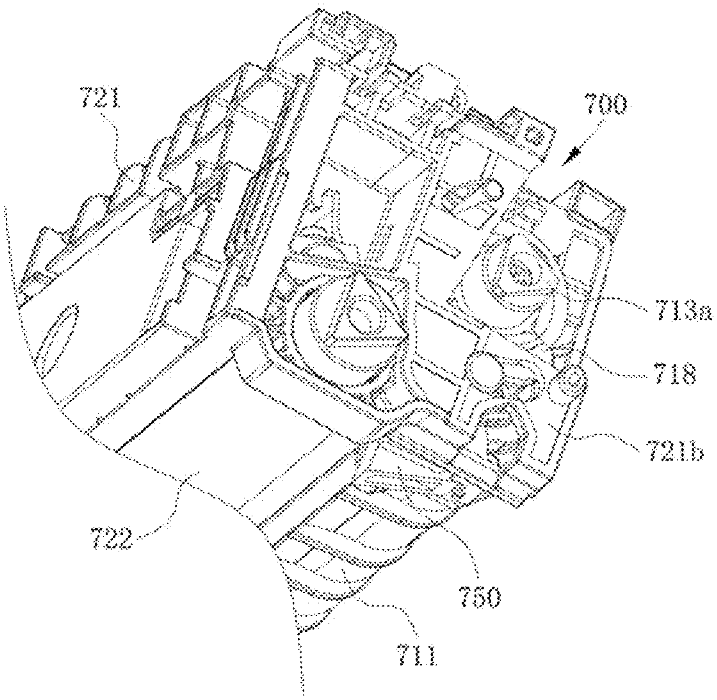
FIG. 39 is a schematic view of a process cartridge in Embodiment 5 of the present disclosure from a first viewing angle.
Figure 40:
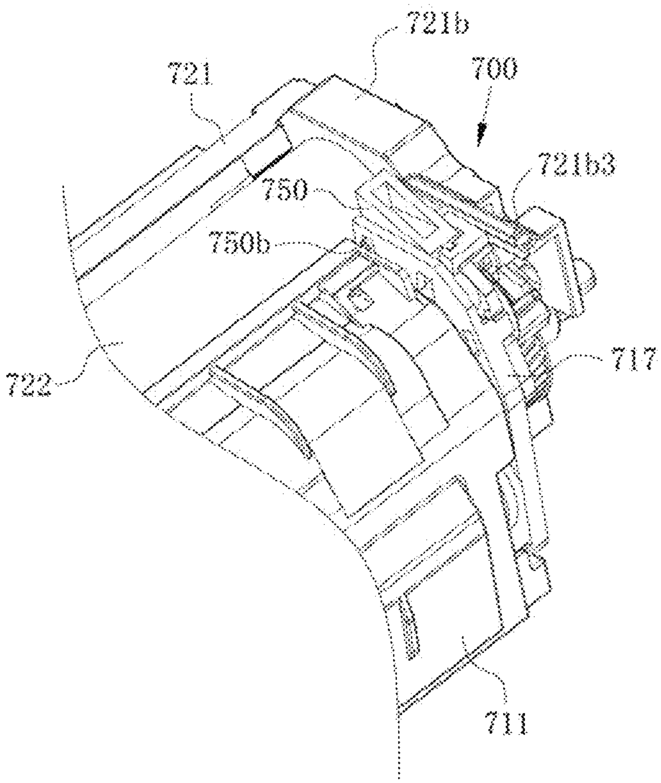
FIG. 40 is a schematic view of the process cartridge in Embodiment 5 of the present disclosure from a second viewing angle.
Figure 41:
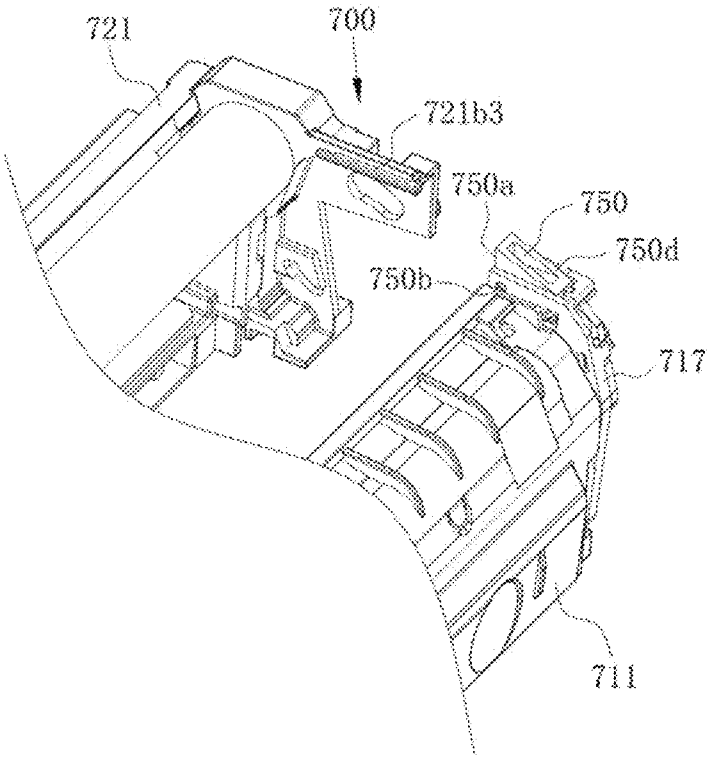
FIG. 41 is a schematic view of the separation of a developing unit and a drum unit in Embodiment 5 of the present disclosure from the first viewing angle.
Figure 42:
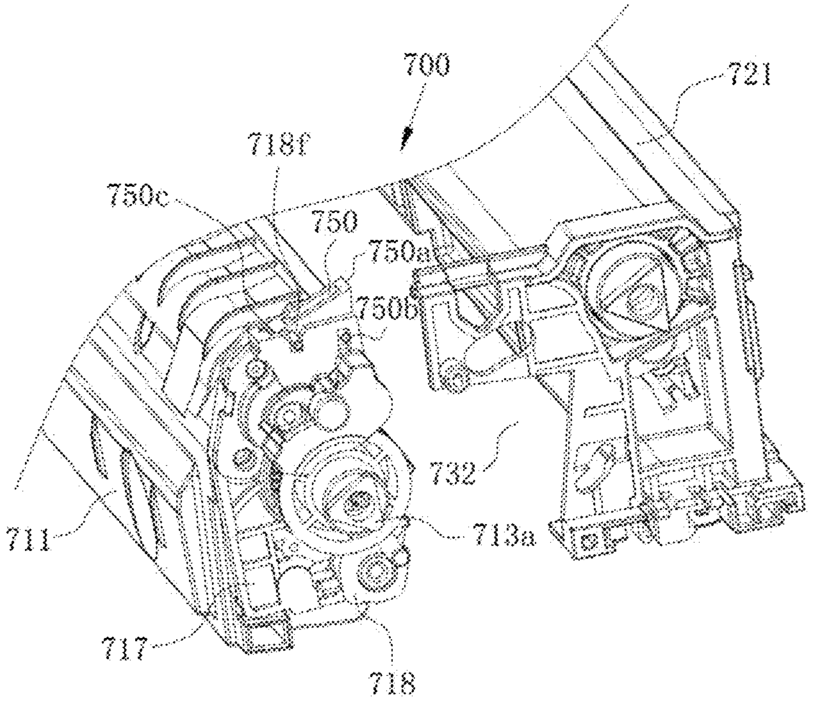
FIG. 42 is a schematic view of the separation of the developing unit and the drum unit in Embodiment 5 of the present disclosure from the second viewing angle.
Figure 43:
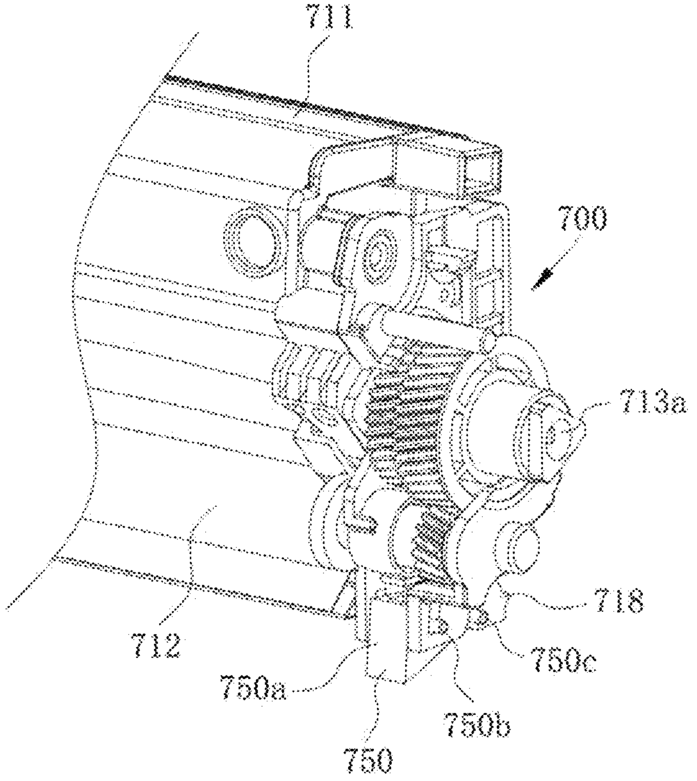
FIG. 43 is a schematic view of the developing unit in Embodiment 5 of the present disclosure.
Figure 44:
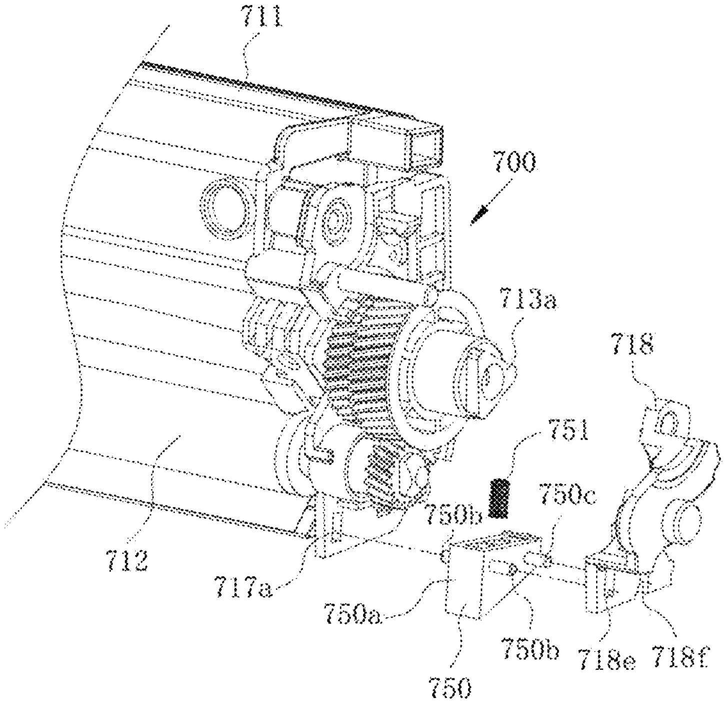
FIG. 44 is an exploded schematic view of the developing unit in Embodiment 5 of the present disclosure.
Figure 45:
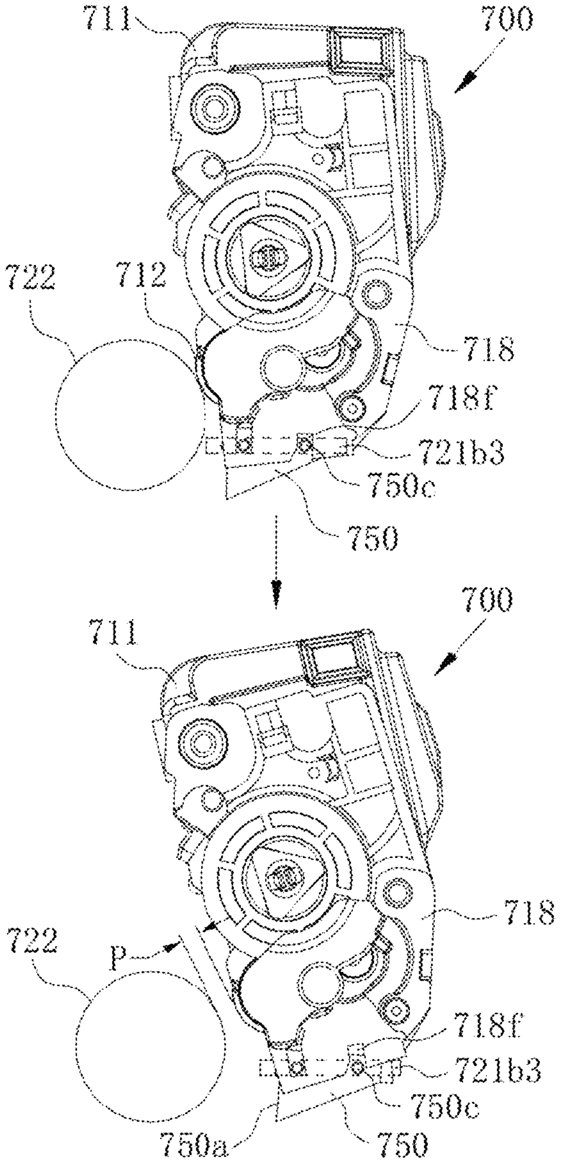
FIG. 45 is a schematic view when a developing roller is in contact with a photosensitive drum, and then the developing roller is separated from the photosensitive drum, in Embodiment 5 of the present disclosure.
Figure 46:
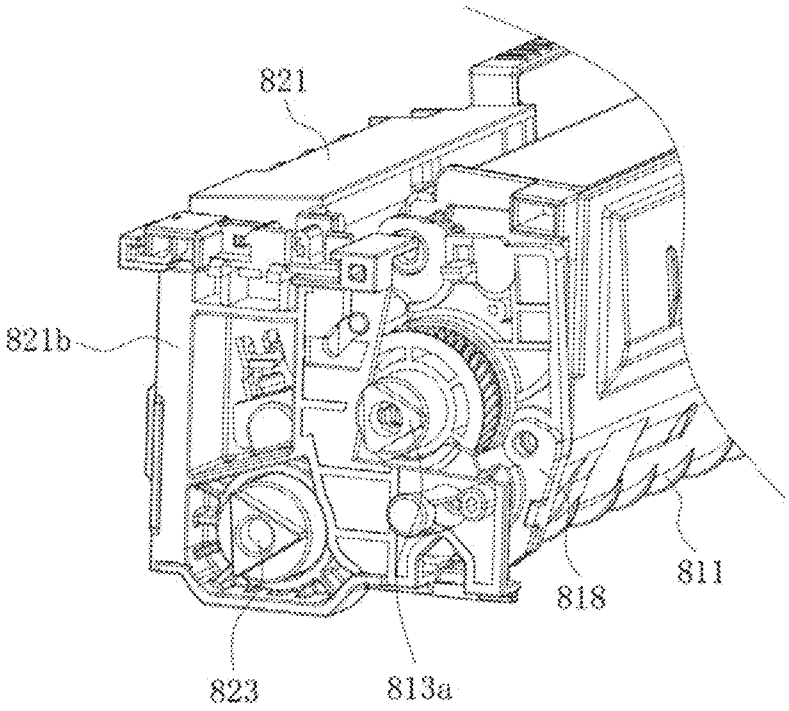
FIG. 46 is a schematic view of a process cartridge in Embodiment 6 of the present disclosure from a first viewing angle.
Figure 47:
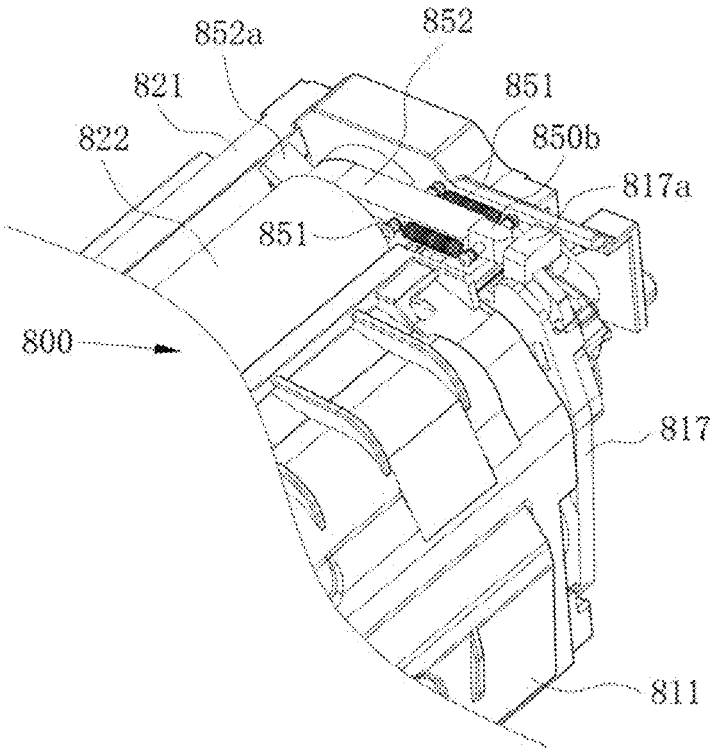
FIG. 47 is a schematic view of the process cartridge in Embodiment 6 of the present disclosure from a second viewing angle.
Figure 48:
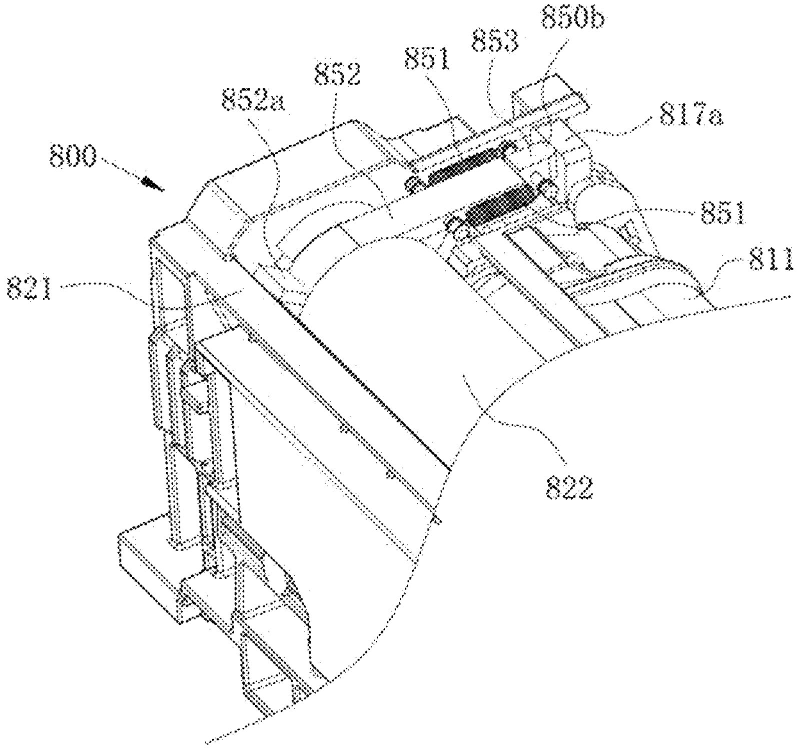
FIG. 48 is a schematic view of the process cartridge in Embodiment 6 of the present disclosure from a third viewing angle.
Figure 49:
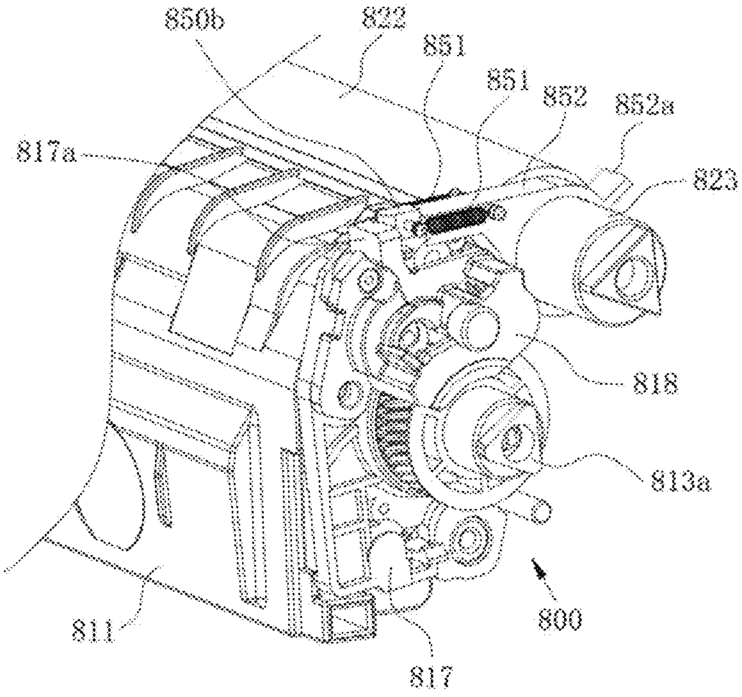
FIG. 49 is a schematic view of the process cartridge in Embodiment 6 of the present disclosure from a fourth viewing angle.
Figure 50:
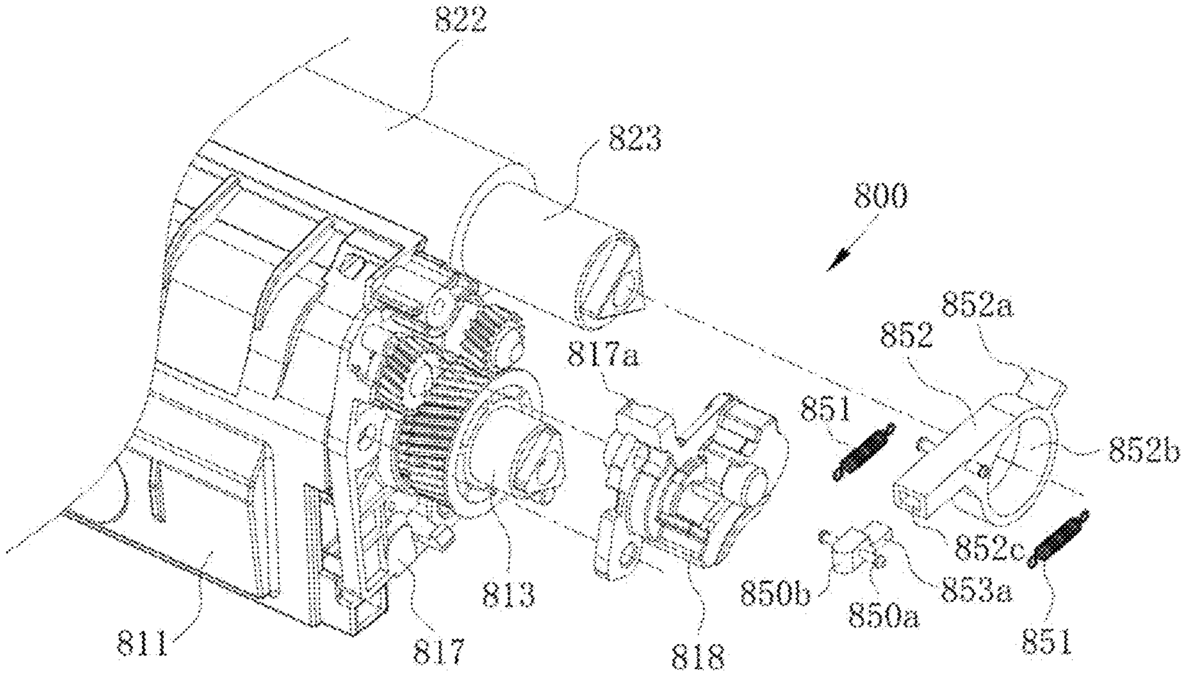
FIG. 50 is an exploded schematic view of the processing cartridge in Embodiment 6 of the present disclosure.

For the convenience of description, directions of a process cartridge 100 are now defined. A developing roller 112 may rotate about a developing roller rotation axis extending along a left-right direction (first direction), and a first coupling 113*a* is arranged at a right end (first end) of the process cartridge 100 in the left-right direction. The process cartridge 100 may be mounted in an image forming device along a direction from rear to front (second direction). The direction perpendicular to the left-right direction and the front-rear direction is an up-down direction (third direction).

As shown in FIGS. 1-17, a process cartridge 100 in Embodiment 1 of the present disclosure is shown. The process cartridge 100 may be detachably mounted in an image forming device along the direction from rear to front. The process cartridge 100 includes a developing unit 110 and a drum unit 120 that are connected to each other. The developing unit 110 may swing around the drum unit 120 within a certain range.

The developing unit 110 includes a developing frame 111 that can accommodate developer, and a developing roller 112 and a supply roller 114 supported on the developing frame 111. The developing unit 110 further includes a driving assembly 119 arranged at the right end of the developing frame 111 to drive the developing roller 112 and the supply roller 114 to rotate. The developing roller 112 and the supply roller 114 may each rotate about a rotation axis extending in the left-right direction, that is, the developing roller 112 may rotate about a developing roller rotation axis, and the supply roller 114 may rotate about a supply roller rotation axis. Specifically, the driving assembly 119 includes a first coupling member 113, and the first coupling member 113 has a first coupling 113*a* that can receive external force, and a developing roller gear 115 arranged at one end of the developing roller 112 and capable of rotating together with the developing roller 112, and a supply roller gear 116 arranged at one end of the supply roller 114 and capable of rotating together with the supply roller 114. The first coupling member 113 may transmit rotational force to the developing roller 112 and the supply roller 114 respectively through the developing roller gear 115 and the supply roller gear 116. A bearing plate 117 is provided at the right end of the developing frame 111, and the first coupling member 113, the developing roller gear 115 and the supply roller gear 116 are each rotatably supported on the right side portion of the bearing plate 117, so that one side (i.e., the left side) of the driving assembly 119 is stably positioned.

The drum unit 120 includes a drum frame 121, and the drum frame 121 includes a drum frame body 121*c* that can accommodate waste developer, and a non-driving side cover 121*a* and a driving side cover 121*b* which are arranged on the left and right sides of the drum frame body 121*c*, respectively. The non-driving side cover 121*a* and the driving side cover 121*b* may be used to connect the developing frame 111 and the drum frame 121. Preferably, the drum frame body 121*c*, the non-driving side cover 121*a* and the driving side cover 121*b* are integrally formed, which not only need only one set of molds when producing the drum frame 121, thereby reducing the production cost, but also eliminates the need to assemble the drum frame 121, thereby improving the assembling efficiency of the process cartridge 100.

Further, the drum unit 120 further includes a chip holder 140 detachably mounted on the drum frame 121 and a chip 141 supported on the chip holder 140. Since the volume of the chip holder 140 is larger than that of the chip 141, the chip holder 140 is detachable to facilitate an operator to upgrade or replace the chip more conveniently, thereby improving the operation experience. The chip holder 140 and the chip 141 are arranged at the right end of the drum frame 121 in the left-right direction, and at the upper end of the drum frame 121 in the up-down direction. When the process cartridge 100 is mounted in an image forming device, a chip contact assembly of the image forming device may elastically press the chip holder 140 and the chip 141 from top to bottom, so as to stably maintain the electrical contact with the chip 141. Specifically, the chip holder 140 is detachably mounted on the drum frame 121 by means of an elastic buckle 149 arranged on the drum frame 121, but as an alternative, the elastic buckle 149 may also be arranged on the chip holder 140. Further, guide ribs 151 are provided on the front and rear sides of the chip holder 140, and correspondingly, guide grooves 151 are provided on the drum frame 121 in a matching manner. During the process of mounting the chip holder 140 to the drum frame 121, the guide ribs 151 of the chip holder 140 can be inserted into the guide grooves 151 of the drum frame 121 in a matching manner, and can be guided to be mounted on the drum frame 121, so as to facilitate the pre-positioning of the chip holder 140 during the installation process, thereby improving the installation speed of the chip holder 140.

Further, the drum unit 120 further includes a positioning portion 147 for supporting and positioning the process cartridge 100, and the positioning portion 147 is configured as an inclined surface intersecting the front-rear direction, so that it can fit as closely as possible with a positioning component of the image forming device, thereby improving the positioning stability of the process cartridge. The positioning portion 147 is located at one end of the drum frame 121 in the left-right direction, and is symmetrically arranged on the front and rear sides of the photosensitive drum rotation axis in the front-rear direction. In other words, the positioning portion 147 has an overlapping part with the chip holder 140 in the front-rear direction, and is located at the lower end of the chip holder 140 in the up-down direction. Therefore, through such an arrangement, when the process cartridge 100 is mounted in the image forming device, the chip holder 140 may be pressed toward the positioning portion 147 by the chip contact assembly, so that the positioning portion 147 maintains a stable fit with the image forming device, which will be helpful to improve the positioning stability of the process cartridge 100.

Further, the drum unit 120 further includes a photosensitive drum 122 supported on the drum frame 120 and a charging roller 146 supported on a charging roller bracket 143. When the process cartridge 100 performs a printing task, the charging roller 146 is maintained in contact with the photosensitive drum 122 and may charge the photosensitive drum 122, and the developing roller 112 and the photosensitive drum 122 are also maintained in close contact with each other at a certain pressure to ensure that the developer on the developing roller 112 is conveyed to the photosensitive drum 122. Further, a second coupling member 123 is provided at the right end of the photosensitive drum 122, and the second coupling member 123 is rotatably supported on the driving side cover 121*b*. Moreover, at least a part of the second coupling member may pass through an exposure hole 144 formed on the driving side cover 121*b* to be exposed to the outside of the process cartridge 100, so as to ensure that the second coupling member 123 can be coupled to the image forming device to receive driving force, the second coupling member 123 can transmit the received driving force to the photosensitive drum 122, and the photosensitive drum 122 can thus be driven to rotate. It is worth mentioning that in this embodiment, the driving side cover 121*b* for rotatably supporting the second coupling member 123 may be used as a bearing member to support the second coupling member 123, that is, the bearing member is provided with a structure such as the exposure hole 144.

Further, the drum unit 120 further includes an accommodating groove 145 formed on the drum frame 121. The accommodating groove 145 is specifically arranged on the driving side cover 121*b* of the drum frame 121, and is configured as a groove recessed in the radial direction from the inner surface of the exposure hole 144. In the process cartridge 100, the second coupling member 123 is in contact with the inner surface of the exposure hole 144, and is spaced apart from the accommodating groove 145. The accommodating groove 145 can accommodate a certain amount of lubricant such as butter, thereby reducing the friction force between the second coupling member 123 and the driving side cover 121*b*, improving the smoothness of the rotation of the second coupling member 123, and reducing the noise generated by the rotation of the second coupling member 123. Further, in order to accommodate as much lubricant as possible, reduce friction and improve smoothness, and also to prevent too many accommodating grooves 145 from making the structure of the drum frame 121 complicated, it is defined that there are M accommodating grooves 145, where 1≤M≤20, preferably, 4≤M≤10. Furthermore, in order to obtain suitable lubricity performance, the recessed depth of the accommodating groove 145 should be appropriate. When the accommodating groove 145 is too deep, too much lubricant will be accommodated, which will cause unnecessary waste, but when the accommodating groove 145 is too shallow, the amount of lubricant accommodated is too small, which cannot achieve a good lubrication effect. Therefore, the recessed depth of the accommodating groove 145 should be appropriate, and the maximum distance between the photosensitive drum rotation axis and the accommodating groove 145 is defined as P, where 14 mm≤P 18 mm; preferably, 14.5 mm≤P≤16 mm.

Further, in order to prevent the charging roller 146 from being in contact with the photosensitive drum 122 for a long time before the process cartridge 100 is used, thereby causing the charging roller 146 to be deformed and in turn affecting the performance of the charging roller 146 in charging the photosensitive drum 122, the process cartridge 100 further includes a separator 148, and the separator 148 is detachably mounted in the process cartridge 100 and can be used to separate the charging roller 146 and the photosensitive drum 122. Specifically, mounting holes 142 are formed on the non-driving side cover 121*a* and the driving side cover 121*b* of the drum frame 121. In the up-down direction, the mounting holes 142 are located on the lower side of the electrical contact surface of the chip holder 140 and the chip 141, and on the upper side of the photosensitive drum rotation axis. That is to say, in the up-down direction, the mounting holes 142 are located between the electrical contact surface of the chip holder 140 and the chip 141 and the photosensitive drum rotation axis, and have an overlapping part with the first coupling member 113 in the up-down direction. When viewed along the left-right direction, the mounting holes 142 may expose at least a part of the charging roller bracket 143 and the charging roller 146. The separator 148 may be inserted along the mounting hole 142 between the charging roller 146 and the photosensitive drum 122 to force the charging roller 146 to maintain separated from the photosensitive drum 122. When the process cartridge 100 needs to be used, a user may remove the separator 148, and the charging roller 146 will come in contact with the photosensitive drum 122 again, so that a printing task can be performed. Preferably, two separators 148 are provided, and the two separators 148 are arranged at the left and right ends of the process cartridge 100, respectively, so as to ensure that the left and right ends of the charging roller 146 and the photosensitive drum 122 are all separated.

In order to avoid the problem that the developing roller 112 is deformed to result in defective printing quality due to the long-term close contact between the developing roller 112 and the photosensitive drum 122 when the process cartridge 100 is not performing a printing task, the drum unit 120 is further provided with a force receiving member 124, and the force receiving member 124 is mounted on the driving side cover 121*b* of the drum frame 121. The force receiving member 124 has a force receiving surface 124*a* located at the lower end of the drum frame 121. The force receiving surface 124*a* may receive external force to push, thereby causing the force receiving member 124 to move relative to the developing unit 110, and the force receiving surface 124*a* may push a pushed portion of the bearing plate 117 during the movement. This forces the developing frame 111 of the developing unit 110 to swing around the drum unit 120 with a rotation axis of the first coupling 113 as an axis from a first position where the developing roller 112 comes in contact with the photosensitive drum 122 to a second position where the developing roller 112 is not in contact with the photosensitive drum 122. Finally, the developing roller 112 supported on the developing unit 110 is separated from the photosensitive drum 122 by a certain distance. That is to say, by providing a force receiving member 124, the developing roller 112 may move in response to the movement of the force receiving member 124, and the developing roller 112 and the photosensitive drum 122 may move between the contact position where they are in contact with each other and the separation position where they are separated from (not in contact with) each other.

As can be known from the foregoing description, the left side of the driving assembly 119 of the developing unit 110 is positioned by the bearing plate 117. Therefore, the process cartridge 100 further includes a bearing cover 118 for positioning the right side of the driving assembly 119. The right ends of the first coupling member 113, the developing roller gear 115, and the supply roller gear 116 are positioned by being limited by the left side portion of the bearing cover 118. The bearing cover 118 is arranged on the drum frame 121 of the drum unit 120. The bearing cover 118 is provided with a first exposure hole 118*c*, and a part of the first coupling member 113 passes through the first exposure hole 118*c* to be exposed outside the process cartridge 100 to receive external force to rotate, and the circumferential direction of the bearing cover 118 is positioned through the first exposure hole 118*c* of the bearing cover 118. Specifically, the bearing cover 118 is arranged on the driving side cover 121*b* of the drum frame 121. In this embodiment, the bearing cover 118 is detachably mounted on the driving side cover 121*b*. In this way, the bearing cover 121*b* and the drum frame 121 are separately arranged. The bearing cover 118 may be made of a material with better wear resistance and self-lubricating properties, such as POM (polyoxymethylene), because of its need to rotatably support the driving assembly 119, while the drum frame 121 which does not have such a requirement may be made of ABS plastic which has poor wear resistance and self-lubricating properties but lower cost. Therefore, the split manufacturing is helpful to reduce the production cost of the process cartridge 100. Optionally, the bearing cover 118 and the driving side cover 121*b* may also be an integrally formed structure. Only one set of molds is needed when producing the bearing cover 118 and the drum frame 121, which is also helpful to reduce the production cost of the process cartridge 100, further simplifies the assembly process and improves the production efficiency. Further, the bearing cover 118 is connected and fixed by a connecting portion 130. As one optional implementation, the connecting portion 130 is configured as a screw. The screw not only has stable connection performance but also has lower cost. The screw may pass through a first connecting hole 118*g* formed on the gear cover 118 and a second connecting hole 121*b*4 formed on the driving side cover 121*b* to mount the gear cover 118 on the drum frame 121. Optionally, as several other optional implementations, the connecting portion 130 may also be configured as an elastic buckle or mounted on the driving side cover 121*b* in an interference fit manner. Such a manner is helpful to simplify the assembly process of the bearing cover 118 and shorten the assembly time.

Further, when the process cartridge 100 is assembled, the gear cover 118 is first mounted on the drum frame 121 and then mounted in cooperation with the developing unit 110. Therefore, it can be known that before the drum frame 121 and the gear cover 118 are mounted in cooperation with the developing unit 110, the first coupling member 113, the developing roller gear 115 and the supply roller gear 116 mounted on the developing unit 110 lose the support and positioning of the gear cover 118, and the first coupling member 113, the developing roller gear 115 and the supply roller gear 116 are easily detached from the developing unit 110 when the process cartridge 100 is assembled. Therefore, in order to avoid this situation, the developing unit 110 is further provided with an anti-detachment portion. As one implementation of the anti-detachment portion, a buckling portion 117*c* protruding outward may be formed on the side of the bearing plate 117 facing the right side of the process cartridge 100. The buckling portion 117*c* is preferably an elastic buckle. As a part for buckling therewith, a buckled portion is provided on the first coupling member 113, and the buckled portion is configured to be formed on the surface of the first coupling member 113 facing the right side of the process cartridge 100. Moreover, a hole 113*c* is provided at a position coaxial with the first coupling member 113. The hole 113*c* extends in the left-right direction and penetrates the first coupling member 113, and the buckling portion 117*c* may pass through the hole 113*c* to be buckled on the buckled portion of the first coupling member 113 to position the first coupling member 113. As another implementation of the anti-detachment portion, the developing roller gear 115 and the supply roller gear 116 may be in interference fit with a developing roller shaft 112*a* and a supply roller shaft 114*a*, respectively. That is to say, the developing roller gear 115 and the supply roller gear 116 are mounted in a tight fit, and the developing roller gear 115 and the supply roller gear 116 will not be detached easily. Therefore, by adopting the above structure, the first coupling member 113, the developing roller gear 115 and the supply roller gear 116 are all stably positioned on the developing unit 110, so that the detachment can be avoided before the gear cover 118 and the drum frame 121 are mounted on the developing unit 110.

It can be known from the foregoing description that the bearing cover 118 is mounted on the drum frame 121, and when the developing unit 110 swings around the drum unit 120, the developing roller 112 supported on the developing unit 110 and the developing roller gear 115 connected to the end of the developing roller 112, the supply roller 114 and the supply roller gear 116 connected to the end of the supply roller 114 will all swing with the swinging of the developing unit 110. Therefore, in order to avoid the developing roller gear 115 and the supply roller gear 116 from interfering with the stationary bearing cover 118 during the swinging process, the bearing cover 118 is further provided with a first avoidance portion 118*a* for avoiding the developing roller shaft 112*a* and the developing roller gear 115, and a second avoidance portion 118*b* for avoiding the supply roller shaft 114*a* and the supply roller gear 116. The first avoidance portion 118*a* and the second avoidance portion 118*b* are arranged at intervals in the left-right direction to respectively avoid the developing roller gear 115 and the supply roller gear 116. The first avoidance portion 118*a* and the second avoidance portion 118*b* are both configured as accommodating spaces formed on the bearing cover 118, wherein the first avoidance portion 118*a* is specifically a strip-shaped slide groove formed on the bearing cover 118, and the second avoidance portion 118*b* is also a strip-shaped slide groove formed on the bearing cover 118, preferably an arc-shaped slide groove. The developing roller shaft 112*a* and the developing roller gear 115, and the supply roller shaft 114*a* and the supply roller gear 116 can respectively slide under the avoidance of the first avoidance portion 118*a* and the second avoidance portion 118*b* to avoid interference when they are swinging.

Embodiment 2

Next, Embodiment 2 of the present disclosure will be described in detail with reference to FIGS. 18-21. A process cartridge 200 is shown in Embodiment 2. The parts of the process cartridge 200 that are the same as those of the process cartridge in Embodiment 1 described above will not be described in detail in this embodiment, and the difference will be emphatically described below.

The bearing cover 218 of the process cartridge 200 is arranged on the developing unit 210. The bearing cover 218 rotatably supports the developing roller gear 215 and the supply roller gear 216, so that the right sides of the two are positioned, and the right end of the first coupling member 213 may be blocked by a part of the bearing cover 218 and positioned. When viewed in the left-right direction, the bearing cover 218 covers at least a part of the first coupling member 213. In other words, when projected in the left-right direction, the bearing cover 218 and the first coupling member 213 have an overlapping part to prevent them from being easily detached from the developing unit 210 to the right. Therefore, through the joint positioning of the bearing plate 217 and the bearing cover 218, the developing roller gear 215, the supply roller gear 216 and the first coupling member 213 may likewise be stably mounted in the developing unit 210. Optionally, they may also be positioned by being blocked to the right by abutting against the driving side cover 221*b*. That is to say, such a manner allows the bearing cover 218 to be positioned selectively by the driving side cover 221*b* without being provided with a blocking part for blocking the first coupling member 213 to the right.

Moreover, it is further different from the above embodiment in that the exposure hole for the first coupling 213*a* to pass through is no longer formed in the bearing cover 218. Based on this structure, the bearing cover 218 is provided with a second avoidance space 219, which may also be referred to as a notch or an opening. The first coupling 213*a* may pass through the second avoidance space 219. In the length direction of the process cartridge 200, the second avoidance space 219 penetrates the bearing cover 218. In a direction intersecting the length direction of the process cartridge 200, the second avoidance space 219 is communicated with the outside of the process cartridge 200. Preferably, at least the front end and the upper end of the second avoidance space 219 are communicated with the outside of the process cartridge. On the basis of ensuring that the developing roller gear and the supply roller gear can be stably positioned, and the first coupling member 213 can be partially positioned, the size of the second avoidance space 219 is increased, which can facilitate the assembly of parts onto the bearing cover 218 while minimizing blocking and interference. Based on the structure that the bearing cover 218 is provided with the second avoidance space 219, the first coupling 213*a* may also pass through a second exposure hole 221*d* formed on the driving side cover 221*b* of the drum frame 221 to be exposed to the outside, so that the circumferential direction of the first coupling 213*a* is positioned. The developing unit 210 is connected to the drum unit through a connecting portion configured as the second exposure hole 221*d*. By adopting the above structure, the material usage of the bearing cover 218 can be reduced, thereby reducing the production cost.

Of course, optionally, a bearing cover having an exposure hole formed therein (that is, the bearing cover is separately arranged from the bearing cover supporting the developing roller gear 215 and the supply roller gear 216) may also be mounted on the drum frame 221, and the first coupling member 213 may be supported on the bearing cover so that its circumferential direction is positioned; or the bearing cover having the exposure hole formed therein may also be manufactured into an integrally formed structure with the drum frame 221.

Another difference is that the bearing cover 218 is mounted on the developing unit 210 and may swing in response to the swing of the developing unit 210. Therefore, an urged portion 217*a* in this embodiment may be provided on the bearing cover 218, and optionally, it may also be provided on the bearing plate 217 as described in Embodiment 1 above.

Embodiment 3

Next, Embodiment 3 of the present disclosure will be described in detail with reference to FIGS. 22-30. A process cartridge 300 is shown in Embodiment 3. The parts of the process cartridge 200 that are the same as those of the process cartridges in Embodiments 1-2 described above will not be described in detail in this embodiment, and the difference will be emphatically described below.

The driving side cover 321*b* of the process cartridge 300 is not provided with the second exposure hole for the first coupling 313*a* to pass through, and the second coupling member is supported in a third exposure hole provided in the driving side cover 321*b*. That is to say, the process cartridge 300 is only provided with one exposure hole for the second coupling member to pass through. Specifically, a first avoidance space 338 is provided on the front upper side of the driving side cover 321*b*, and the first avoidance space 338 is configured as a notch being open (exposed) to the outside formed on the driving side cover 321*b*, which may also be referred to as an opening. In the left-right direction, the first avoidance space 338 penetrates the driving side cover 321*b*. In a direction perpendicular to the left-right direction, namely, in a direction perpendicular to the length direction of the process cartridge 300, the first avoidance space 338 is communicated with the outside of the process cartridge 300. When the developing unit swings between a first position and a second position, the first avoidance space 338 can be used to avoid the first coupling 313*a*. Further, the first avoidance space 338 is configured to at least partially face the front side and the upper side of the process cartridge 300, that is, the front end and the upper end of the first avoidance space 338 are both communicated with the outside of the process cartridge 300, so that the driving side cover 321*b* is generally "L"-shaped when viewed along the length direction of the process cartridge 300, specifically, when viewed from the right side to the left side of the process cartridge 300. When the developing unit and the drum unit are assembled, the developing unit may be mounted on the drum unit in a straight line along the same direction without switching the direction, which greatly improves the combination efficiency of the process cartridge.

In other words, a first surface 338*a* formed on the driving side cover 321*b* and facing the front end of the process cartridge 300 is provided at the rear end of the first avoidance space 338, and a second surface 338*b* formed on the driving side cover 321*b* and facing the upper end of the process cartridge 300 is provided at the lower end of the first avoidance space 338. A notch 338*c* is formed between the upper end of the first surface 338*a* and the front end of the second surface 338*b* in a direction perpendicular to the left-right direction. In the front-rear direction, a first point of the upper end of the first surface 338*a* is located at the rear end of the rotation axis of the first coupling 313*a*, and in the up-down direction, a second point of the front end of the second surface 338*b* is located at the lower end of the rotation axis of the first coupling 313*a*.

Further, with the rotation axis of the first coupling 313*a* as a reference, in a direction perpendicular to the left-right direction, a first line segment P1 connecting the rotation axis of the first coupling 313*a* and the upper end of the first surface 338*a* is made, a second line segment P2 connecting the rotation axis of the first coupling 313*a* and the front end of the second surface 338*b* is made, and an angle α is formed between the first line segment P1 and the second line segment P2, where 90°<α<270°. On the one hand, when a exceeds 90°, the first avoidance space 338 becomes large enough, and the probability of the developing unit being blocked when the developing unit is mounted on the drum unit is reduced, which can accelerate the assembling speed of the developing unit. On the other hand, it can avoid affecting the arrangement, support and positioning of parts (such as a chip) on the developing unit when a exceeds 270°. Therefore, it is appropriate when a is within the above range; more preferably, 90°<α<180°.

It can be seen that in the process cartridge 300, the first avoidance space 338 can be used to avoid and accommodate the first coupling member 313, but cannot stably support the first coupling member 313. Therefore, the first coupling member 313 as a rotatable component needs to ensure stable positioning in the process cartridge 300. Further, a buckling portion 317*c* protruding outward may be formed on the side of the bearing plate 317 facing the right side of the process cartridge 300. The buckling portion 317*c* is preferably an elastic buckle. As a part for buckling therewith, a buckled portion 313*b* is provided on the first coupling member 313, and the buckled portion 313*b* is configured to be formed on the surface of the first coupling member 313 facing the right side of the process cartridge 300. A hole 313*c* is provided at a position coaxial with the first coupling member 313. The hole 113*c* extends in the left-right direction and penetrates the first coupling member 313, and the buckling portion 317*c* may pass through the hole 313*c* to be buckled on the buckled portion 313*b* of the first coupling member 313. Compared with the aforementioned embodiments, the first coupling member 313 can be further positioned, which can not only prevent the first coupling member 313 from being detached from the developing unit 310, but also reduce the degree of shaking of the first coupling member 313 during rotation. Moreover, since the bearing plate 317 originally needs to be made of a material with certain wear resistance and self-lubricating properties, and the driving side cover 321*b* does not need to support the first coupling member 313 and thus does not need to be made of a material with higher wear resistance and better self-lubricating properties, this significantly reduces the production cost of the process cartridge 300.

Further, it can be known from the foregoing description that the developing unit 310 in this embodiment is no longer connected to the drum unit 320 through the first coupling member 313. Therefore, the developing unit of the process cartridge 300 in this embodiment is further provided with a connecting portion which is different from that in Embodiment 1 described previously, and the connecting portion allows the developing unit to be connected to the drum unit in a swingable manner.

Further, the connecting portion includes a first connecting portion 332 and a second connecting portion 339 respectively arranged at two ends of the length direction of the developing unit 310, the first connecting portion 332 is located at the right end of the developing unit 310, and the second connecting portion 339 is located at the left end of the developing unit 310. When projected along the length direction of the process cartridge 300, at least one of the first connecting portion 332 and the second connecting portion 339 is located outside the projection range of the first coupling 313*a*. That is to say, when viewed along the left-right direction of the process cartridge 300, at least one of the first connecting portion 332 and the second connecting portion 339 does not overlap with the first coupling 313*a*, that is, they are spaced apart. As one optional implementation of this embodiment, the first connecting portion 332 at the right end of the developing unit 310 does not overlap with the first coupling 313*a*, and the second connecting portion 339 at the left end of the developing unit 310 at least a part of overlaps with the first coupling 313*a*. In this case, the first coupling 313*a* and the driving side cover 321*b* are spaced apart to avoid the problem that the first coupling 313*a* repeatedly rubs against the driving side cover 321*b* during rotation, causing the driving side cover 321*b* to be worn. As another optional implementation of this embodiment, the first connecting portion 332 and the second connecting portion 339 are both outside the projection range of the first coupling 313*a* when projected along the length direction of the process cartridge 300, that is, each of the first connecting portion 332 and the second connecting portion 339 does not overlap with the first coupling 313*a*, so that the connecting portions at the left and right ends of the developing unit 310 are kept relatively symmetrical as much as possible, thereby improving the swing stability and accuracy of the developing unit 310.

Preferably, a pair of first connecting portions 332 are provided, and the pair of first connecting portions 332 are arranged on both sides of the first coupling 313*a*, respectively, so that the right end of the developing unit 310 can be supported in a more balanced manner. Specifically, when viewed from the right side to the left side of the process cartridge 300, one of the first connecting portions 332 is arranged on the upper side of the rotation axis of the first coupling member 313. and the other first connecting portions 332 is arranged on the lower side of the rotation axis of the first coupling member 313, One of the first connecting portions 332 is arranged on the bearing plate 317, and the other first connecting portion 332 is arranged on the bearing cover 318. One of the first connecting portions 332 is configured as a cylindrical protrusion or boss protruding to the right from the right side of the bearing plate 317, and the other first connecting portion 332 is configured as a cylindrical protrusion or boss protruding to the right from the right side of the bearing cover 318. As a structure matched therewith, the driving side cover 321*b* is provided with a pair of first connected portions 321*b*1 configured as grooves. The pair of first connecting portions 332 may be inserted into the pair of first connected portions 321*b*1 in a matching manner to connect the developing unit 310 to the drum unit 320. Meanwhile, in order to allow the developing unit 310 to swing around the drum unit 320 to achieve the contact and separation between the developing roller and the photosensitive drum, the first connected portions 321*b*1 are configured as arc-shaped grooves, which can provide a sliding space for the first connecting portions 332 during the sliding process to avoid interference. When the process cartridge 300 is not subjected to external force, an elastic member arranged on the upper side of the left end of the process cartridge 300 may apply force to the developing unit 310, so that the left end of the developing roller moves toward the direction approaching the photosensitive drum to force the developing roller to maintain close contact with the photosensitive drum. Further, the first connected portion 321*b*1 configured as an arc-shaped groove has a length W in the front-rear direction, where 2 mm≤W≤20 mm. When W is less than 2 mm, the swing distance of the developing unit 310 around the drum unit is insufficient, which will make it difficult to separate the developing roller from the photosensitive drum or limit the separation distance. Moreover, when a separating component of a printer pushes the developing unit 310, due to the insufficient swing distance of the developing unit 310, the separating component of the printer will interfere with the developing unit 310, which may easily cause damage to the process cartridge 300 or the printer. When W is greater than 20 mm, the shaking of the first connecting portion 332 of the developing unit 310 in the arc-shaped groove will increase when the process cartridge 300 is not mounted in the image forming device, thereby causing the shaking of the developing unit 310 to increase, which may easily cause damage to the parts of the process cartridge 300. Further, the center of the arc-shaped groove coincides with the rotation axis of the first coupling 313*a*, so that the developing unit 310 does not need to change the swing center, and can still swing around the first coupling 313*a* around the drum unit 320 like the developing unit in the above embodiments. The structural changes of the process cartridge 300 are reduced, thereby reducing the production cost.

The swing center on the left side of the developing unit 310 is coaxially arranged with the swing center on the right side. Next, the structure of the swing center on the left side of the developing unit 310 will be described in detail. The left side of the developing unit 310 has a second connecting portion 339, and the second connecting portion 339 can be used to connect the developing unit 310 and the drum unit 320 together. The developing unit 310 may swing around the drum unit 320 with the second connecting portion 339 as the swing center. Preferably, the second connecting portion 339 is a cylindrical pin. Specifically, a first hole 321*a*1 is formed in the drum unit 320. Preferably, the first hole 321*a*1 is formed on the non-driving side cover 321*a* of the drum frame 321. A second hole 327*a* is formed on the developing unit 310. Preferably, the second hole 327*a* is formed on an electrode component 327 (to be described later). The second connecting portion 339 may pass through the first hole 321*a*1 and the second hole 327*a* separately to connect the drum frame 321 and a developing frame 311 together, so that the left side of the developing unit 310 is positioned relative to the drum unit 320. Optionally, the second hole 327*a* may also be formed on the developing frame 311 or other components, which is not a limitation.

The electrode component 327 includes an electrode electrical contact surface that can be in electrical contact with a power supply component of the image forming device. The electrode electrical contact surface is arranged at the left end of the developing unit 310 in the left-right direction. The electrode component 327 is configured to be in electrical contact with the power supply component in the image forming device and to transmit power to components such as the developing roller. A third avoidance space 380 is formed on the non-driving side cover 321*a* at the left end of the drum frame 321. The third avoidance space 380 is configured as an opening, and at least a part of the electrode component 327 may pass through the third avoidance space 380 to expose the electrode electrical contact surface to the outside of the process cartridge 300, so that the electrode electrical contact surface is in electrical contact with the power supply component of the image forming device. Further, the front end of the third avoidance space 380 is communicated with the outside of the process cartridge 300, and when the developing unit 310 is mounted on the drum unit 320 along a direction intersecting the left-right direction, the electrode component 327 can enter the third avoidance space 380 along the front end through the third avoidance space 380, so that the developing unit 310 can be mounted on the drum unit 320 without being blocked.

The process cartridge 300 further includes a developer conveying channel (not shown) communicating with the inside and outside of a developer accommodating cavity. The developer conveying channel extends in the left-right direction and is configured to extend from the left end to the right end of the developing frame 311. In order to prevent the developer in the developing frame 311 from leaking from the developer conveying channel when the process cartridge 300 is not used, the process cartridge 300 further includes a sealing strip (not shown) for sealing the developer conveying channel. However, when the process cartridge 300 is used, in order to ensure that the developer in the developing frame 311 can be conveyed to the developing roller through the developer conveying channel, the sealing strip needs to be removed from the developer conveying channel. Therefore, a sealing opening 382 is further provided at the left end of the developing frame 311. One end of the sealing strip in the length direction extends outward from a sealing strip removal port and is exposed to the outside of the process cartridge 300. When viewed along the left-right direction, the sealing opening 382 has an overlapping part with the third avoidance space 380, so that the sealing strip can be removed smoothly without being blocked by the non-driving side cover 321*a* when being removed.

In addition, the left end of the developing frame 311 of the process cartridge 300 is further provided with a developer filling port 381 communicating with the inside and outside of the developing frame 311 and a sealing cover 383 mounted on the developer filling port 381. When the developer in the developing frame 311 is used up, the user can remove the sealing cover 383, and then replenish the developer into the developing frame 311 through the developer filling port 381, which greatly increases the convenience of the user to replenish the developer. When viewed along the left-right direction, the sealing cover 383 and the non-driving side cover 321*a* have an overlapping part, and the non-driving side cover 321*a* is located on the left side of the sealing cover 383 in the left-right direction. That is, the non-driving side cover 321*a* is located on the outside of the sealing cover 383 in the left-right direction. Moreover, the gap between the two is not large. In this way, the user can be restricted from removing the sealing cover 383 too easily to a certain extent, thereby reducing the risk of the sealing cover 386 being accidentally opened and causing the developer to leak.

It is worth mentioning that the swing centers on the left and right sides of the developing unit 310 of the process cartridge 300 in this embodiment have not changed, and are still the rotation axis of the first coupling 313*a*. Moreover, as mentioned previously in this embodiment, the first avoidance space 322 is provided on the driving side cover 321*b*. As an embodiment, the gear cover 318 in this embodiment may be configured as a structure substantially the same as the gear cover in Embodiment 2, that is, the gear cover 318 is not provided with the exposure hole for the first coupling 313*a* to pass through, which will not be repeated here. This reduces the material consumption of the gear cover 318 and the drum frame 321, which is helpful to reduce the production cost of the process cartridge 300. Of course, optionally, the process cartridge 300 in this embodiment may also be configured so that the gear cover 318 has a hole for the first coupling 313*a* to pass through, so as to stably position the first coupling 313*a*, the developing roller gear and the supply roller gear.

Embodiment 4

Next, Embodiment 4 of the present disclosure will be described in detail with reference to FIGS. 31-38. A process cartridge 400 is shown in Embodiment 4. The parts of the process cartridge 400 that are the same as those in the process cartridge in Embodiment 3 described above will not be described in detail in this embodiment, and the difference is that the swing center of the developing unit 410 around the drum unit 420 has changed.

It should be noted that the process cartridge 400 in this embodiment is still provided with a first avoidance space 438 like the process cartridge in Embodiment 3 above, and its structure and position are substantially the same as those in Embodiment 3 above, and will not be repeated here; the difference is that the position of the connecting portion is different from that in the above embodiment.

The connecting portion still includes a first connecting portion 432 and a second connecting portion 433 respectively arranged at both ends of the length direction of the developing unit 410, wherein the first connecting portion 432 is located at the right end of the developing unit 410, and the second connecting portion 433 is located at the left end of the developing unit 410. When projected along the length direction of the process cartridge 400, at least one of the first connecting portion 432 and the second connecting portion 433 is located outside the projection range of the first coupling 413*a*. That is to say, when viewed along the left-right direction of the process cartridge 400, at least one of the first connecting portion 432 and the second connecting portion 433 does not overlap with the first coupling 413*a*, that is, they are spaced apart. Preferably, when projected along the length direction of the process cartridge 400, the first connecting portion 432 and the second connecting portion 433 are both located outside the projection range of the first coupling 413*a*, that is, each of the first connecting portion 432 and the second connecting portion 433 does not overlap with the first coupling 413*a*.

First, the right end of the developing unit 410 is described as an example. The bearing cover 418 and the driving side cover 421*b* are both provided with holes. The first connecting portion 432 passes through the holes on the bearing cover 418 and the driving side cover 421*b* separately to connect the developing unit 410 and the drum unit 420 together. During the process of contact and separation between the developing roller 412 and the photosensitive drum 422, the developing unit 410 can swing with the holes on the bearing cover 418 and the driving side cover 421*b* or the first connecting portion 432 as a fulcrum 431. That is to say, in this embodiment, the swing center of the developing unit 410 is the first connecting portion 432 or the fulcrum 431. When viewed along the length direction of the process cartridge 400, the first connecting portion 432 and the fulcrum 431 overlap with each other, that is, the first connecting portion 432 is the fulcrum of the developing unit 410, and the developing unit 410 can swing relative to the drum unit 420 with the first connecting portion 432 as the fulcrum.

The second connecting portion 433 at the right end of the developing unit 410 and the installation method of the second connecting portion 433 are substantially the same as those of the first connecting portion 432, and will not be repeated here. However, it is worth mentioning that the right end of the developing unit 410 may rotate with the second connecting portion 433 as a swing center. Of course, it is also possible not to rotate with the second connecting portion 433 as the swing center. That is to say, at least one of the first connecting portion 432 and the second connecting portion 433 overlaps with the swing center of the developing unit 410 relative to the drum unit 420, which is not a limitation. Of course, as a preferred implementation in this embodiment, the first connecting portion 432 and the second connecting portion 433 are coaxially arranged, that is, the first connecting portion 432 and the second connecting portion 433 both overlap with the swing center of the developing unit 410 relative to the drum unit 420, so that the rotation centers of the left and right ends of the developing unit 410 remain relatively symmetrical, thereby improving the swing stability and accuracy of the developing unit 410.

Further, in the up-down direction, the first connecting portion 432 or the fulcrum 431 is arranged between the rotation axis of the first coupling 413*a* and the photosensitive drum axis of the photosensitive drum 422, and in the front-rear direction, the first connecting portion 432 is located between the developing roller axis of the developing roller 412 and the photosensitive drum axis of the photosensitive drum 422, so as to ensure that the length L1 from the fulcrum 431 to a first force applying portion 427 of an elastic member 445 (i.e., the acting portion of the elastic member 445 acting on the developing unit 410) is greater than the length L2 from the fulcrum 431 to the rotation axis of the developing roller 412, that is, L1 is greater than L2. According to the moment calculation formula of M (moment)=F (acting force)·L (lever arm), it can be seen that the structure is a force-saving lever. Further, on a plane orthogonal to the left-right direction, a line segment L1 of connecting the fulcrum 431 and the first force applying portion 427 is made, and a line segment L2 of connecting the fulcrum 431 and the rotation axis of the developing roller 412 is made. The extension direction of L1 and the extension direction of L2 are not parallel, but are arranged crosswise at an angle α, where $90° \leq \alpha \leq 180°$, so that the fulcrum 431 is arranged sufficiently close to the first axis. Preferably, $110° \leq \alpha \leq 150°$. Furthermore, the fulcrum 431 is closer to the contact portion 412*b* of the developing roller 412 that is in contact with the photosensitive drum 422 than the rotation axis of the first coupling 413*a*. That is to say, compared with the swing center (i.e., the first coupling 413*a*) of the developing unit 410 in the aforementioned embodiment, the swing center (i.e., the fulcrum 431) of the developing unit 410 in this embodiment is closer to the contact portion 412*b* of the developing roller 412, namely, L2 will be smaller. When the developing roller 412 and the photosensitive drum 422 are kept in close contact with a constant pressure, the elastic force F generated by the elastic member 445 can be set to be smaller to meet the required pressure value between the developing roller 412 and the photosensitive drum 422, which can reduce the elastic force of the elastic member 445, and prevent the elastic force of the elastic member 445 from being set excessively large to squeeze the developing frame 411 and the drum frame 421, causing them to be deformed and damaged and affecting the service life of the process cartridge 400.

Further, at least one of the first connecting portion 432 and the second connecting portion 433 is configured as a metal pin. Preferably, the first connecting portion 432 and the second connecting portion 433 are both configured as metal pins, so that the diameter of the connecting portion can be made smaller while improving the strength of the connecting portions. As a result, the hole on the driving side cover 421*b* for the connecting portion to pass through can be as far away as possible from the first avoidance space 438, which allows the wall thickness between the hole and the first avoidance space 438 to become thicker, thereby avoiding local breakage of the driving side cover 421*b* due to insufficient strength.

As an optional implementation in this embodiment, in the case that the swing center of the developer unit 410 is changed, the process cartridge 400 can retain the structure as in Embodiment 2 in which the gear cover 418 is not provided with the hole for the first coupling 413*a* to pass through, and the structure as in Embodiment 3 in which the driving side cover 321*b* of the drum frame 421 is not provided with the hole for the first coupling 413*a* to pass through, so as to minimize the material consumption and reduce the production cost. However, as another optional implementation, the process cartridge 400 can retain the structure as in Embodiment 2 in which the gear cover 418 is not provided with the hole for the first coupling 413*a* to pass through, and the structure in which the driving side cover 421*b* of the drum frame 421 is provided with the hole for the first coupling 413*a* to pass through, so as to increase support and positioning for the first coupling 413*a* and improve the rotational stability of the first coupling 413*a*.

Embodiment 5

Next, Embodiment 5 of the present disclosure will be described in detail with reference to FIGS. 39-45. A process cartridge 700 is shown in this Embodiment 5. The process cartridge 700 has the same parts as those in Embodiments 1-4 described above. For example, each of the bearing cover 718 of the process cartridge 700 and the driving side cover 721*b* of the drum frame 721 is not provided with a hole for the first coupling 713*a* to pass through. This aspect of the structure has been described in the above embodiments and will not be described in detail here. Optionally, the bearing cover 718 and the drum frame 721 may adopt a structure in which only one of them is not provided with a hole, and the other is provided with a hole. This is also possible. The parts of the process cartridge 700 in this embodiment that are the same as those in the above embodiments will not be described here, and the difference is that the structure of the process cartridge 700 that forces the developing roller 712 and the photosensitive drum 722 to come into contact and separate is different.

Specifically, in the present embodiment, the force receiving member 750 is rotatably arranged on the developing frame 711. After being pressed, the force receiving member 750 can rotate relative to the developing frame 711 and retract into the developing frame 711. When the process cartridge 700 is working, an external force applying member comes into contact with and presses the force receiving surface 750*a* of the force receiving member 750 to drive the force receiving member 750 together with the developing roller 712 or the developing frame 711 to rotate and separate relative to the photosensitive drum 722. When the force applying member removes the force applied to the force receiving surface 750*a*, the developing roller 712 is reset and comes into contact with the photosensitive drum 722.

The surface of the force receiving member 750 adjacent to the force receiving surface 750*a* is an inclined surface 750*d*, and the force receiving member 750 is further provided with a guiding portion 750*c* and a pushing portion 750*b*. The developing frame 711 is provided with a first force receiving portion 717*a* and a second force receiving portion 718*e* matched with the pushing portion 750*b*, wherein the first force receiving portion 717*a* is specifically provided on the bearing plate 717, and the second force receiving portion 718*e* is specifically provided on the bearing cover 718. The drum frame 721 is provided with a track 721*b*3 configured as a groove for the guiding portion 750*c* to slide. The track 721*b*3 is specifically provided on the driving side cover 721*b*, and the track 721*b*3 extends in the front-rear direction and provides a path for moving in the front-rear direction, so that the force receiving surface 750*a* will not retract in the up-down direction but can only move in the front-rear direction, so as to ensure that the developing frame 711 always maintains sufficient meshing with a force applying member of the image forming device during the rotation process, thereby avoiding the possibility of the two being out of meshing and improving the force receiving stability of the force receiving member 750. Two pushing portions 750*b* are provided, and are arranged on the opposite sides of the force receiving member 750 in the left-right direction, respectively. The two pushing portions 750*b* are correspondingly matched with the first force receiving portion 717*a* and the second force receiving portion 718*e*. The first force receiving portion 717*a* and the second force receiving portion 718*e* have the same structure, and the only difference is that the first force receiving portion 717*a* is arranged on the bearing plate 717. In other words, the two pushing portions 750*b* are mirror-imaged and arranged on the left and right sides of the force receiving member 750. Further, the guiding portion 750*c* and the pushing portion 750*b* are both protrusions protruding from the sides (left and right sides) of the force receiving member 750, and the pushing portion 750*b* is arranged on the rear side of the guiding portion 750*c* in the front-rear direction. The guiding portion 750*c* and the pushing portion 750*b* are both in the shape of cylindrical rods, and the first force receiving portion 717*a* and the second force receiving portion 718*e* are both in the shape of strip-shaped holes. When the inclined surface 750*d* of the force receiving member 750 is under pressure, the force receiving member 750 rotates along the axis of the guiding portion 750*c*. At this time, the two pushing portions 750*b* rotate along the axis of the guiding portion 750*c* in the first force receiving portion 717*a* and the second force receiving portion 718*e* of the strip-shaped hole, respectively. The first force receiving portion 717*a* and the second force receiving portion 718*e* are not subjected to pressure along the direction of the track 721*b*3, and thus the developing roller 712 does not swing relative to the photosensitive drum 722. When the force receiving surface 750*a* is under pressure, the pushing portion 750*b* moves along the direction guided by the track 721*b*3 and presses the first force receiving portion 717*a*/the second force receiving portion 718*e*, thereby pushing the developing frame 711 to swing relative to the drum frame 721, so that the separation of the developing roller 712 and the photosensitive drum 722 is realized.

Further, a slot 718*f* for supporting the guiding portion 750*c* is further provided on the bearing cover 718. The guiding portion 750*c* can rotate in the slot 718*f* to avoid the rotating guiding portion 750*c*. Specifically, after the force receiving member 750 is pressed to cause the developing frame 711 to swing relative to the drum frame 721, in order to ensure that the force receiving member 750 moves in the front-rear direction along the track 721*b*3, the force receiving member 750 needs to rotate by a certain angle relative to the developing frame 711 to maintain the movement of the force receiving member 750 in the front-rear direction.

Further, an elastic portion 751 is further provided between the force receiving member 750 and the developing frame 711. The elastic portion 751 can force the retracted force receiving member 750 to reset. Preferably, the elastic portion 751 is a compression spring. During the process of mounting the process cartridge 700 to an image forming device along an installation direction, when the force applying member presses the inclined surface 750*d*, the force receiving member 750 rotates relative to the developing frame 711 along the center of the guiding portion 750*c*, and the force receiving member 750 retracts into the developing frame 711 and gives way to the force applying member to ensure that the force applying member can pass over the force receiving member 750 and be mounted in a correct position. Meanwhile, the spring connected to the force applying member is not deformed by pressure or only deformed a little, thereby effectively extending the service life of the spring and avoiding the problem of no rebound due to partial or complete failure of elasticity. It should be noted that at this time, the elastic modulus of the elastic portion 751 should be smaller than that of the spring. That is, when the force applying member presses the force receiving member 750, the force receiving member 750 can retract. After the force applying member passes over the force receiving member 750, the force receiving member 750 rebounds under the action of the elastic portion 751.

The installation and working process of this process cartridge are as follows: During installation, the force applying member of the image forming device comes into contact with and presses the inclined surface 750*d* of the force receiving member 750, and the force receiving member 750 is pressed to rotate relative to the developing frame 711 and retract into the developing frame 711. At this time, the force receiving member 750 gives way to the force applying member, so that the force applying member can be smoothly mounted to the correct position without compressing or slightly compressing the spring connected thereto, and then the force receiving member 750 is reset under the elastic restoring force of the elastic portion 751.

During working, the external force applying member comes into contact with and presses the force receiving surface 750*a* of the force receiving member 750 to drive the force receiving member 750 to move in the front-rear direction along the track 721*b*3. During this process, the force receiving member 750 can push the developing frame 711 to swing relative to the drum frame 721, so that the developing roller 712 supported on the developing frame 711 is separated from the photosensitive drum 722 supported on the drum frame 721, and they are spaced apart by a distance P. After the separation is completed, when the force applying member removes the pressure on the force receiving surface 750*a*, the developing roller 712 and the photosensitive drum 722 will come into contact again.

Embodiment 6

Next, Embodiment 6 of the present disclosure will be described in detail with reference to FIGS. 46-51. A process cartridge 800 is shown in this Embodiment 6. The process cartridge 800 has the same parts as those in Embodiments 1-5 described above. For example, each of the bearing cover 818 of the process cartridge 800 and the driving side cover 821*b* of the drum frame 821 is not provided with the hole for the first coupling 813*a* to pass through. This aspect of the structure has been described in some of Embodiments 1-5 described above, and will not be described in detail here. Optionally, the bearing cover 818 and the drum frame 821 may adopt a structure in which only one of them is not provided with a hole, and the other is provided with a hole. This is also possible. The parts of the process cartridge 800 in this embodiment that are the same as those in the above embodiments will not be described here, and the difference is that the structure of the process cartridge 800 that forces the developing roller 812 and the photosensitive drum 822 to come into contact and separate is different.

The force receiving member includes a mounting portion 852 and an action portion 853 which are connected to each other. The action portion 853 is movable relative to the mounting portion 852. The mounting portion 852 is sleeved and mounted on the second coupling member 823 at one end of the photosensitive drum 822. The action portion 853 is used to engage with the force applying component of the image forming device and receive the driving force applied by the force applying component to force the developing roller 812 and the photosensitive drum 822 to separate from each other. The mounting portion 852 and the action portion 853 will be described in detail below.

The mounting portion 852 is arranged between the photosensitive drum 822 and the driving side cover 821*b*. Preferably, the mounting portion 852 abuts between the photosensitive drum 822 and the driving side cover 821*b*, so as to limit the position of the mounting portion 852 in the left-right direction and prevent the mounting portion 852 from shaking in the left-right direction. The mounting portion 852 includes a hollow annular joint portion 852*b*. The joint portion 852*b* has a size that matches the size of the outer peripheral surface of the second coupling 823, and the mounting portion 852 is sleeved and mounted on the outer peripheral surface of the second coupling 823 through the joint portion 852*b* to radially position the mounting portion 852. The mounting portion 852 further includes a limiting portion 852*a*. The limiting portion 852*a* is arranged on the rear side of the mounting portion 852, and is configured as a rib that protrudes outward from the joint portion 852*b* in a radial direction (a direction perpendicular to the left-right direction). The limiting portion 852*a* abuts against the drum frame 821 to limit the rotation of the mounting portion 852. When viewed from right to left, the limiting portion 852*a* can limit the rotation of the mounting portion 852 in the clockwise direction. Meanwhile, the mounting portion 852 abuts against the developing frame 811, which can limit the rotation of the mounting portion 852 in the counterclockwise direction when viewed from right to left. Therefore, through the above structure, the mounting portion 852 is stably positioned in the process cartridge 800, and its position relative to the photosensitive drum 822 is kept stable. A mounting hole 852*c* is provided on a side (i.e., the front side) of the mounting portion 852 away from the second coupling 823, and a part of the action portion 853 can be mounted in the mounting hole 852*c* so that the action portion 853 and the mounting portion 852 are connected to each other.

The action portion 853 includes a force receiving surface 850*a*, a pushing portion 850*b* and a guiding portion 853*a*. The positions, structures and functions of the force receiving surface 850*a* and the pushing portion 850*b* are substantially similar to those of the force receiving surface and the pushing portion in the above embodiments and have been described in the above embodiments, and thus will not be described in detail here. The guiding portion 853*a* is configured as a rib that matches the size of the mounting hole 852*c*. Specifically, the size of the guiding portion 853*a* is slightly smaller than the size of the mounting hole 852*c*. The guiding portion 853*a* is accommodated in the mounting hole 852*c* in a clearance fit. The guiding portion 853*a* may move in the mounting hole 852*c*. That is to say, the action portion 853 may move relative to the mounting portion 852 through the movement of the guiding portion 853*a* in the mounting hole 852*c*.

Figure 51:
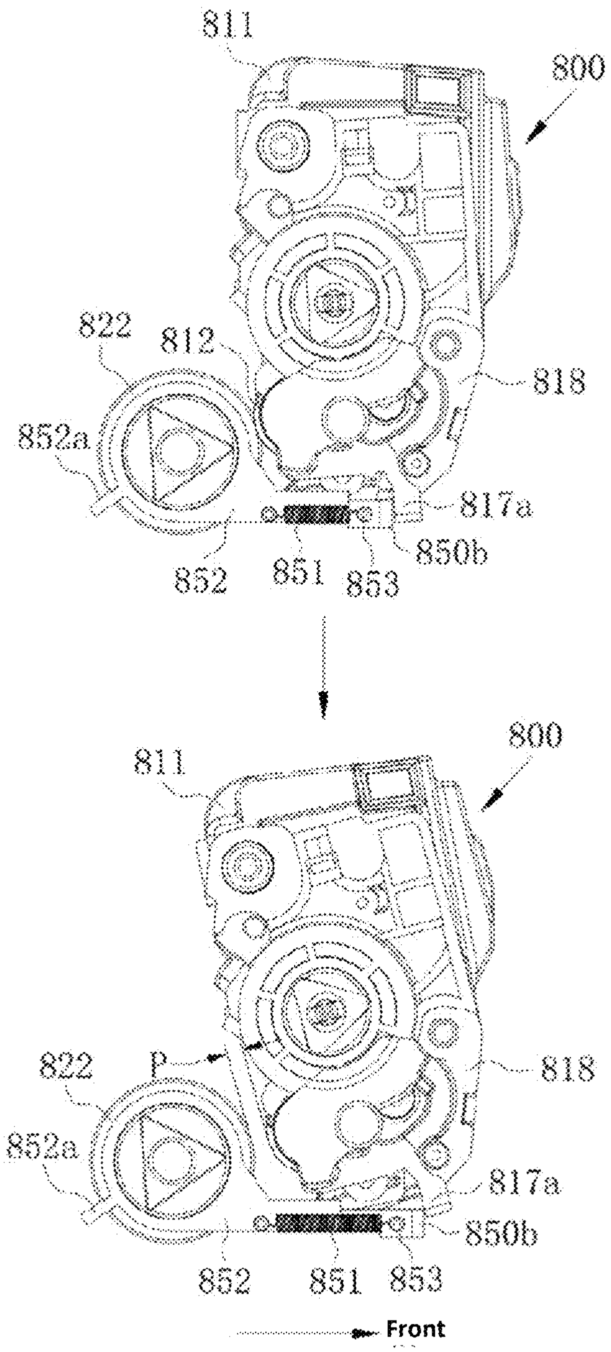
FIG. 51 is a schematic view when a developing roller is in contact with a photosensitive drum, and then the developing roller is separated from the photosensitive drum, in Embodiment 6 of the present disclosure.

When the process cartridge 800 is mounted in the image forming device and the force applying member of the image forming device applies force to the force receiving surface 850*a*, the action portion 853 may move relative to the mounting portion 852 in a forward direction shown in FIG. 51, thereby pushing the force receiving portion 817*a* of the bearing plate 817, so that the developing frame 811 swings relative to the drum frame 821, and then the developing roller 812 supported on the developing frame 811 is separated from the photosensitive drum 822 by a distance P. During this process, the size of the contact surface between the action portion 853 and the force applying member substantially remains unchanged, the two maintain stable engagement, and the force transmission stability is improved. Moreover, during this process, the mounting portion 852 is not affected by the movement of the action portion 853 and remains stable relative to the photosensitive drum 822.

Further, an elastic portion 851 is connected between the mounting portion 852 and the action portion 853. Preferably, a pair of elastic portions 851 are provided, and the pair of elastic portions 851 are provided on the left and right sides of the action portion 853, respectively, to ensure that the elastic force exerted on the action portion 853 remains balanced, thereby avoiding the position of the action portion 853 from being shifted. Specifically, the left and right sides of the action portion 853 are provided with ribs protruding outward, respectively, and the left and right sides of the mounting portion 852 are also provided with ribs protruding outward, respectively. The elastic portions 851 are connected between the ribs of the action portion 853 and the ribs of the mounting portion 852, so as to install the elastic portions 851. The elastic portions 851 are preferably tension springs, so as to be stably connected to the action portion 853 and the mounting portion 852. When the force receiving surface 850*a* is not pushed by the force applying component, that is, when the developing roller 812 and the photosensitive drum 822 remain in contact, the elastic force generated by the elastic portion 851 can keep the action portion 853 in a first position. When the force receiving surface 850*a* is pushed by the force applying component, that is, when the developing roller 812 and the photosensitive drum 822 are separated, the action portion 853 can overcome the elastic force generated by the elastic portion 851 and move from the first position to a second position. At least a part of the action portion 853 in the second position is farther away from the photosensitive drum 822 in the front-rear direction relative to the action portion 853 in the first position. After the pushing force applied to the force receiving surface 850*a* is removed, the elastic force of the elastic portion 851 is released, which can force the action portion 853 to move from the second position to the first position. That is to say, the elastic portion 851 can be used to reset the action portion 853 after movement.

As described above, at least a part of the force receiving member is mounted in a movable manner. Even if the process cartridge 800 falls or collides, the force receiving member has a certain amount of movement, thereby greatly reducing the chance of the force receiving member being broken.

Embodiment 7

Figure 52:
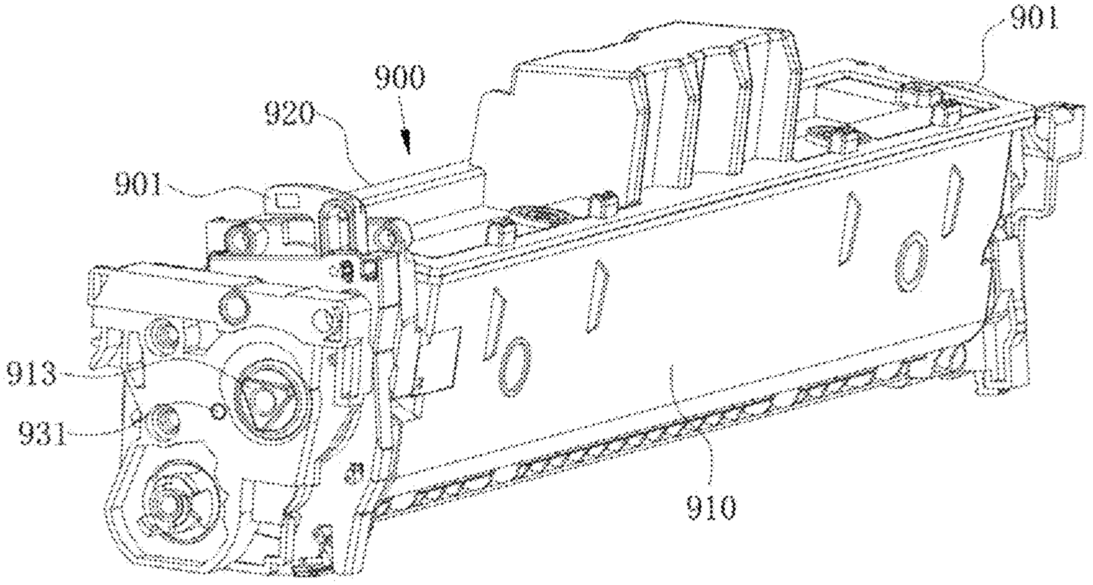
FIG. 52 is a schematic view of a process cartridge in Embodiment 7 of the present disclosure when viewed from a first angle.
Figure 53:
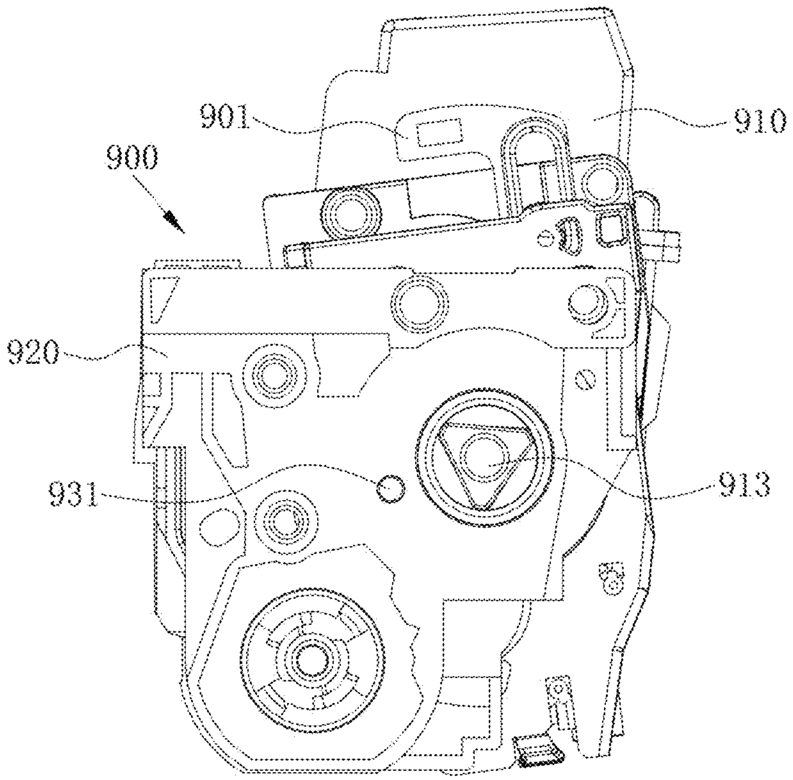
FIG. 53 is a schematic view of the process cartridge in Embodiment 7 of the present disclosure when viewed from a second angle.
Figure 54:
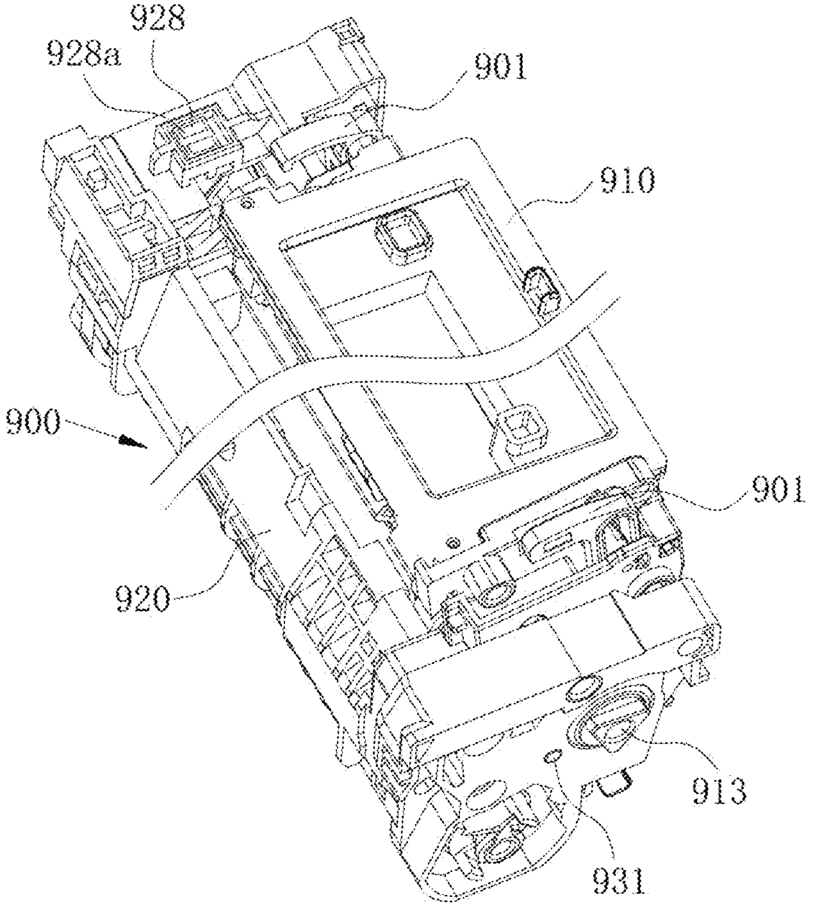
FIG. 54 is a schematic view of the process cartridge in Embodiment 7 of the present disclosure when viewed from a third angle.

As shown in FIGS. 52-54, Embodiment 7 of the present disclosure will be described next. A process cartridge 900 is shown in Embodiment 7. The parts of the process cartridge 900 that are the same as those in Embodiments 1-6 described above will not be described in detail in this Embodiment 7, and they are different in the following aspects. In one aspect, in this embodiment, the electrical contact surface 928*a* of the chip 928 is located at the left end of the upper side of the process cartridge 900, that is, the electrical contact surface 928*a* of the chip 928 and the first coupling 913 are located at different ends of the process cartridge 900 in the left-right direction, and the electrical contact surface 928*a* of the chip 928 and the electrode are located at the same end of the process cartridge 900 in the left-right direction. Therefore, a chip connecting assembly and the power supply component in the image forming device are located on the same end side of the image forming device, which simplifies the circuit arrangement in the image forming device. In another aspect, the process cartridge 900 in this embodiment further includes a partition portion (not shown) configured as a protrusion and a reset member (not shown) configured as a spring. The reset member connects the partition portion and the force receiving member 901. When the force receiving member 901 receives a thrust force and moves, the partition portion may move in response to the movement of the force receiving member 901 under the action of the reset force of the reset member and abut between the developing unit 910 and the drum unit 920, thereby maintaining the separation state of the developing roller and the photosensitive drum. Even if the image forming device no longer applies force to the force receiving member 901, the partition portion may maintain the normal separation between the developing roller and the photosensitive drum. Moreover, a pair of force receiving members 901 are provided in this embodiment, and are mounted at the left and right ends of the developing unit 910, respectively. In this embodiment, the force receiving member 901 is configured as a rod spanning the upper and lower ends of the process cartridge 900 and is movable in the up-down direction relative to the developing frame 911. Specifically, the upper end of the rod (i.e., the force receiving member 901) may receive a pressing force from top to bottom which comes from the upper side of the image forming device, and then the rod is forced to resist the force of the reset member from top to bottom to move from the first position to the second position. When the rod is in the second position, the lower end of the rod may receive a thrust force in the front-rear direction which comes from the lower side of the image forming device. The thrust force may forcefully push the rod, so that the rod can drive the developing unit 910 to swing around the fulcrum 931 relative to the drum unit 920, and the developing roller and the photosensitive drum move from the position where they are in contact with each other to the position where they are separated from each other. It is worth mentioning that the structure and position of the fulcrum 931 in this embodiment are substantially the same as those in Embodiment 4 described above, and will not be described in detail here. As for other structures, the process cartridge in this embodiment may be combined with any of the structures in Embodiments 1-6 described above. For example, the driving side cover of the process cartridge 900 may also be provided with a notch (not shown) for exposing the first coupling 913, which will not be described in detail here.

In one aspect, by arranging the bearing cover or the first coupling on the drum frame of the drum unit, the parts can be transported and stored in the form of assemblies during transportation, which is convenient for subsequent management and assembly of the process cartridge. Alternatively, the arrangement in which the bearing cover is integrally formed with the drum frame can reduce the number of molds used, that is, one set of molds can be used for production, which reduces production costs and simplifies the assembling steps of the process cartridge.

In another aspect, by eliminating the holes in the bearing cover and the driving side cover, other places are used for support and positioning, so that while the material used for manufacturing the bearing cover and the driving side cover is reduced and the production cost is reduced, the developing unit can be mounted along a direction intersecting with the length direction of the process cartridge without being blocked when assembling the process cartridge, thereby greatly improving the assembling speed and efficiency of the process cartridge.

In further another aspect, by setting the fulcrum closer to the rotation axis of the developing roller, the length of the power arm is increased and the length of the resistance arm is reduced. On the premise of ensuring the developer conveying effect from the developing roller to the photosensitive drum, the required pressure value between the developing roller and the photosensitive drum can be met with a smaller elastic force, which is more helpful to accurately control the pressure between the developing roller and the photosensitive drum, and avoids the problem that the elastic force of the elastic member is set excessively large to squeeze the developing frame and the drum frame, causing them to deform and damage, thereby affecting the service life of the process cartridge.

What is claimed is:

1. A process cartridge, comprising:

a frame, with a first end and a second end separated from each other in a first direction, and comprising a developing frame and a drum frame;

a developing roller supported on the developing frame and being rotatable about a developing roller rotation axis extending along the first direction;

a photosensitive drum supported on the drum frame and being rotatable about a photosensitive drum rotation axis;

a first coupling at the first end of the frame, and configured to rotate the developing roller;

a second coupling at the first end of the frame, and configured to rotate the photosensitive drum;

a chip having an electrical contact surface; and a driving side cover at a first end of the drum frame in the first direction, comprising a through hole and a first avoidance opening, wherein at least a portion of the second coupling extends and is exposed through the through hole, at least a portion of the first coupling extends and is exposed through the first avoidance opening, and the first avoidance opening is partially unenclosed in a plane perpendicular to the first direction; and wherein when the process cartridge is oriented such that the photosensitive drum is at a bottom of the process cartridge and the photosensitive drum rotation axis is lower than the developing roller rotation axis, the electrical contact surface is higher than the first coupling and the second coupling, and at least a portion of the first avoidance opening is higher than the photosensitive drum.

2. The process cartridge according to claim 1, further comprising a connecting portion connecting the developing frame and the drum frame, wherein the connecting portion comprises a first connecting portion at a first end of the developing frame in the first direction and a second connecting portion at a second end of the developing frame in the first direction, and an orthographic projection of the first connecting portion onto the plane is-does not overlap an orthographic projection of the first coupling onto the plane.

3. The process cartridge according to claim 2, wherein an orthographic projection of the second connecting portion onto the plane overlaps the orthographic projection of the first coupling.

4. The process cartridge according to claim 3, wherein the second connecting portion is a metal pin.

5. The process cartridge according to claim 2, wherein the first coupling being rotatable about a rotation axis extending along the first direction, at least a part of the first connecting portion is higher than the rotation axis of the first coupling.

6. The process cartridge according to claim 1, further comprising a bearing cover at a first end of the developing frame in the first direction, wherein the bearing cover covers at least a portion of the first coupling, the bearing cover comprises a second avoidance opening partially unenclosed in the plane, and the first coupling extends sequentially through the second avoidance opening and the first avoidance opening and is exposed to the outside of the process cartridge.

7. The process cartridge according to claim 1, wherein the process cartridge further comprises a non-driving side cover at a second end of the drum frame, the non-driving side cover comprising another avoidance opening partially unenclosed in the plane, wherein the process cartridge further comprises an electrode component at the second end of the frame, and at least a portion of the electrode component extends through the other avoidance opening and is exposed to the outside of the process cartridge.

8. The process cartridge according to claim 1, wherein the process cartridge further comprises a non-driving side cover at a second end of the drum frame, a developer filling port at a first end of the developing frame in the first direction and a sealing cover on the developer filling port, wherein the non-driving side cover is farther away in the first direction from the first end of the frame than the developer filling port, and wherein an orthographic projection of the developer filling port onto a plane perpendicular to the first direction overlaps an orthographic projection of the non-driving side cover onto the plane.

9. The process cartridge according to claim 1, wherein the through hole comprises accommodating grooves for accommodating a lubricant in an inner wall of the through hole, and the accommodating grooves are recessed into the inner wall in a radial direction of the through hole.

10. A process cartridge, comprising:

a frame with a first end and a second end separated from each other in a first direction, and comprising a developing frame and a drum frame;

a developing roller supported on the developing frame and being rotatable about a developing roller rotation axis extending along the first direction;

a photosensitive drum supported on the drum frame and being rotatable about a photosensitive drum rotation axis;

a first coupling at the first end of the frame, and configured to rotate the developing roller;

a protrusion operatively connected to the developing frame and is configured to move the developing frame; and a driving side cover at a first end of the drum frame in the first direction, comprising a first avoidance opening, at least a portion of the first coupling extends and is exposed through the first avoidance opening, and the first avoidance opening is partially unenclosed in a plane perpendicular to the first direction;

wherein the developing frame and the drum frame are connected together through a connecting portion, and the connecting portion comprises a first connecting portion at a first end of the developing frame in the first direction and a second connecting portion located at a second end of the developing frame in the first direction;

wherein an orthographic projection of the first connecting portion onto the plane does not overlap an orthographic projection of the first coupling onto the plane, and an orthographic projection of the second connecting portion onto the plane at least partially overlaps an orthographic projection of the first coupling onto the plane; and wherein when the process cartridge is oriented such that the photosensitive drum is at a bottom of the process cartridge and the photosensitive drum rotation axis is lower than the developing roller rotation axis, the protrusion is lower than the first connecting portion.

11. The process cartridge according to claim 10, wherein at least a part of the protrusion is movable in an up-down direction of the process cartridge.

12. The process cartridge according to claim 10, wherein at least a part of the first connecting portion is higher than a rotation axis of the first coupling.

13. The process cartridge according to claim 10, wherein the drum frame has a groove matched with the first connecting portion, the developing frame and the drum frame are connected together by the first connecting portion and the groove, the first connecting portion is movable in the groove, and the protrusion is lower than the first connecting portion and the groove.

14. The process cartridge according to claim 10, further comprising a bearing cover at the first end of the frame and covering at least a portion of the first coupling, wherein the first connecting portion is a boss on the bearing cover.

15. The process cartridge according to claim 10, further comprising a second coupling at one end of the photosensitive drum and a through hole at the first end of the frame, wherein at least a portion of the second coupling extends through the through hole and is supported therein, and the through hole has an accommodating groove for accommodating a lubricant in an inner wall of the through hole, and the accommodating groove is recessed from the inner wall in a radial direction of the through hole.

16. A process cartridge, comprising:

a frame, with a first end and a second end separated from each other in a first direction, and comprising a developing frame and a drum frame;

a developing roller supported on the developing frame and being rotatable about a developing roller rotation axis extending along the first direction;

a photosensitive drum supported on the drum frame;

a first coupling at the first end of the frame, and configured to rotate the developing roller;

a second coupling at an end of the photosensitive drum in the first direction, and configured to rotate the photosensitive drum;

a chip having an electrical contact surface; and a driving side cover at a first end of the drum frame in the first direction, comprising a through hole and a first avoidance opening, wherein at least a portion of the second coupling extends and is exposed through the through hole, the through hole comprises an accommodating groove recessed into an inner wall of the through hole in a radial direction of the through hole and for accommodating a lubricant; and wherein at least a portion of the first coupling extends and is exposed through the first avoidance opening, and the first avoidance opening is partially unenclosed in a plane perpendicular to the first direction.

17. The process cartridge according to claim 16, further comprising a first connecting portion at a first end of the developing frame in the first direction and a groove in the drum frame, wherein the developing frame and the drum frame are connected to each other by the first connecting portion and the groove, and the first connecting portion is movable in the groove.

18. The process cartridge according to claim 17, wherein when the process cartridge is oriented such that the photosensitive drum is at a bottom of the process cartridge and the photosensitive drum rotation axis is lower than the developing roller rotation axis, at least a part of the first connecting portion is higher than a rotation axis of the first coupling.

19. The process cartridge according to claim 16, wherein the process cartridge further comprises a non-driving side cover at a second end of the drum frame in the first direction, the non-driving side cover comprising another avoidance opening partially unenclosed in the plane, wherein the process cartridge further comprises an electrode component at the second end of the frame and electrically connected to the developing roller, and at least a portion of the electrode component extends and is exposed through the other avoidance opening to an outside of the process cartridge.

* * * * *